United States Patent
Diehr et al.

(10) Patent No.: US 11,034,524 B2
(45) Date of Patent: Jun. 15, 2021

(54) ROBOTIC PAYLOAD TRANSPORT SYSTEM

(71) Applicant: Fetch Robotics, Inc., San Jose, CA (US)

(72) Inventors: Eric Diehr, San Jose, CA (US); Andrew Zeller, Mountain View, CA (US)

(73) Assignee: Fetch Robotics, Inc., San Jose, CA (US)

( * ) Notice: Subject to any disclaimer, the term of this patent is extended or adjusted under 35 U.S.C. 154(b) by 0 days.

(21) Appl. No.: 16/816,096

(22) Filed: Mar. 11, 2020

(65) Prior Publication Data
US 2020/0290814 A1   Sep. 17, 2020

Related U.S. Application Data

(60) Provisional application No. 62/817,437, filed on Mar. 12, 2019.

(51) Int. Cl.
| | | |
|---|---|---|
| *B65G 41/00* | (2006.01) | |
| *B65G 13/07* | (2006.01) | |
| *B65G 13/04* | (2006.01) | |

(52) U.S. Cl.
CPC ........... *B65G 41/008* (2013.01); *B65G 13/04* (2013.01); *B65G 13/07* (2013.01); *B65G 41/003* (2013.01); *B65G 2205/04* (2013.01)

(58) Field of Classification Search
CPC .... B65G 41/008; B65G 13/07; B65G 41/003; B65G 13/04; B65G 2205/04; B65G 2201/0258; B25J 5/007; B60P 1/649; B60P 1/64; G05D 2201/0216
See application file for complete search history.

(56) References Cited

U.S. PATENT DOCUMENTS

| | | | | |
|---|---|---|---|---|
| 5,348,140 A | * | 9/1994 | Clos ....................... | B65G 13/07 198/780 |
| 5,632,371 A | * | 5/1997 | Best ....................... | B65G 13/07 193/35 TE |
| 8,381,901 B2 | * | 2/2013 | Yamamoto ............. | B65G 23/08 198/789 |
| 9,637,318 B2 | * | 5/2017 | Messina ................. | B65G 15/00 |
| 2008/0118337 A1 | * | 5/2008 | Vestergaard ......... | B65G 41/008 414/340 |

(Continued)

FOREIGN PATENT DOCUMENTS

| | | | |
|---|---|---|---|
| CN | 108945950 A | * | 12/2018 |
| CN | 110217723 A | * | 9/2019 |

*Primary Examiner* — Mark A Deuble
(74) *Attorney, Agent, or Firm* — J. Steven Svoboda

(57) ABSTRACT

A roller conveyor system configured for installation on top of a mobile robot to provide robotic transport of a payload includes: a roller conveyor, the roller conveyor comprising: a roller assembly, the roller assembly comprising a plurality of rollers, the rollers configured to move a payload, each of the rollers being configured to rotate, the roller assembly comprising a motorized roller and one or more auxiliary rollers, the motorized roller comprising a motor configured to cause the motorized roller to rotate; and a hybrid power transmission configured to drive the rollers, the hybrid power transmission coupling the motorized roller to at least one of the one or more auxiliary rollers, the hybrid power transmission using at least two power transmission methods.

38 Claims, 13 Drawing Sheets

(56) References Cited

U.S. PATENT DOCUMENTS

| | | | | |
|---|---|---|---|---|
| 2017/0334649 A1* | 11/2017 | Ramezani | ............ | H02K 7/1016 |
| 2018/0072212 A1* | 3/2018 | Alfaro | .................. | G05D 1/0278 |
| 2018/0237226 A1* | 8/2018 | Kacel | ..................... | B65G 13/06 |
| 2019/0291956 A1* | 9/2019 | Pajevic | ................ | G05D 1/0088 |
| 2020/0385217 A1* | 12/2020 | Biro | .................... | B65G 41/008 |

* cited by examiner

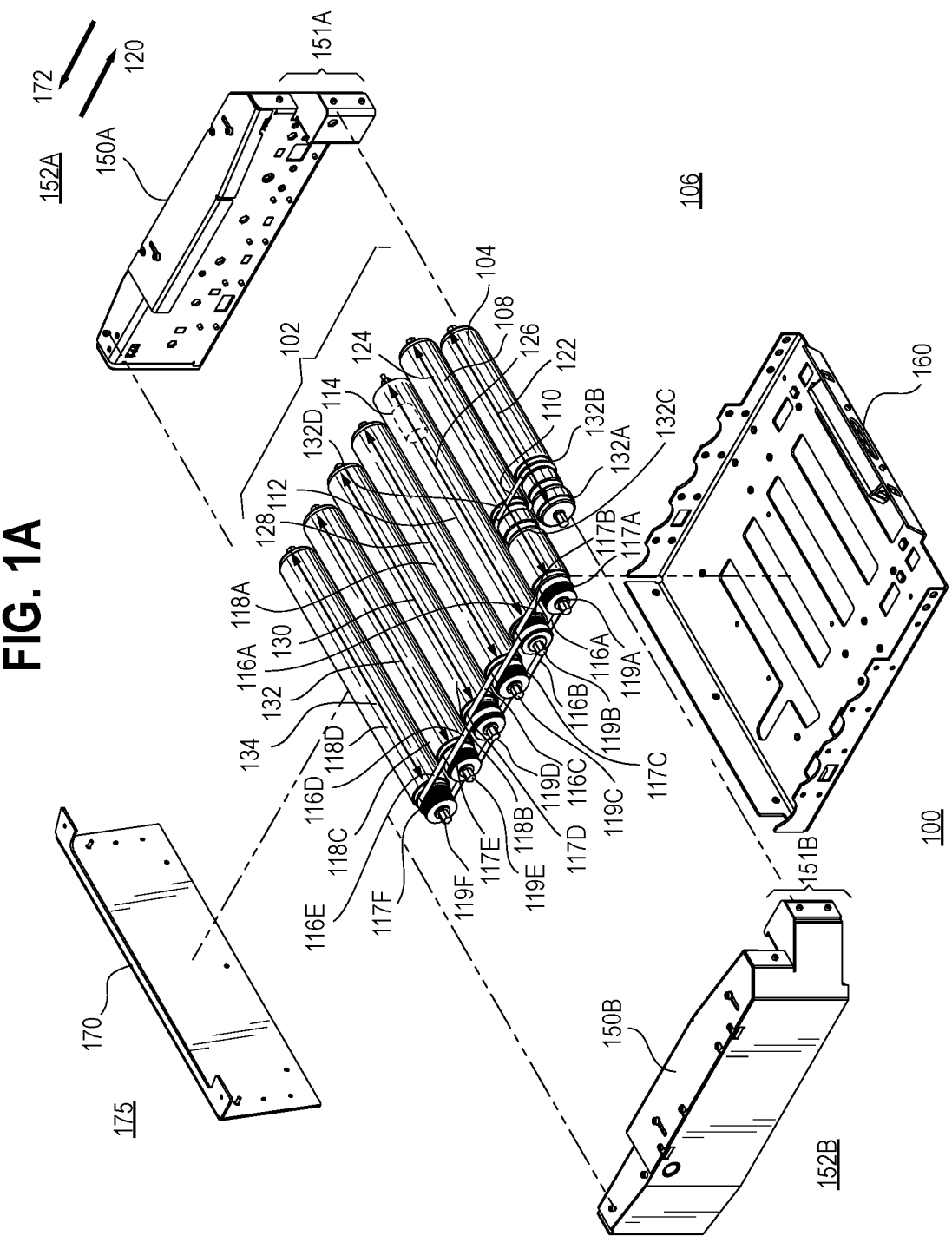

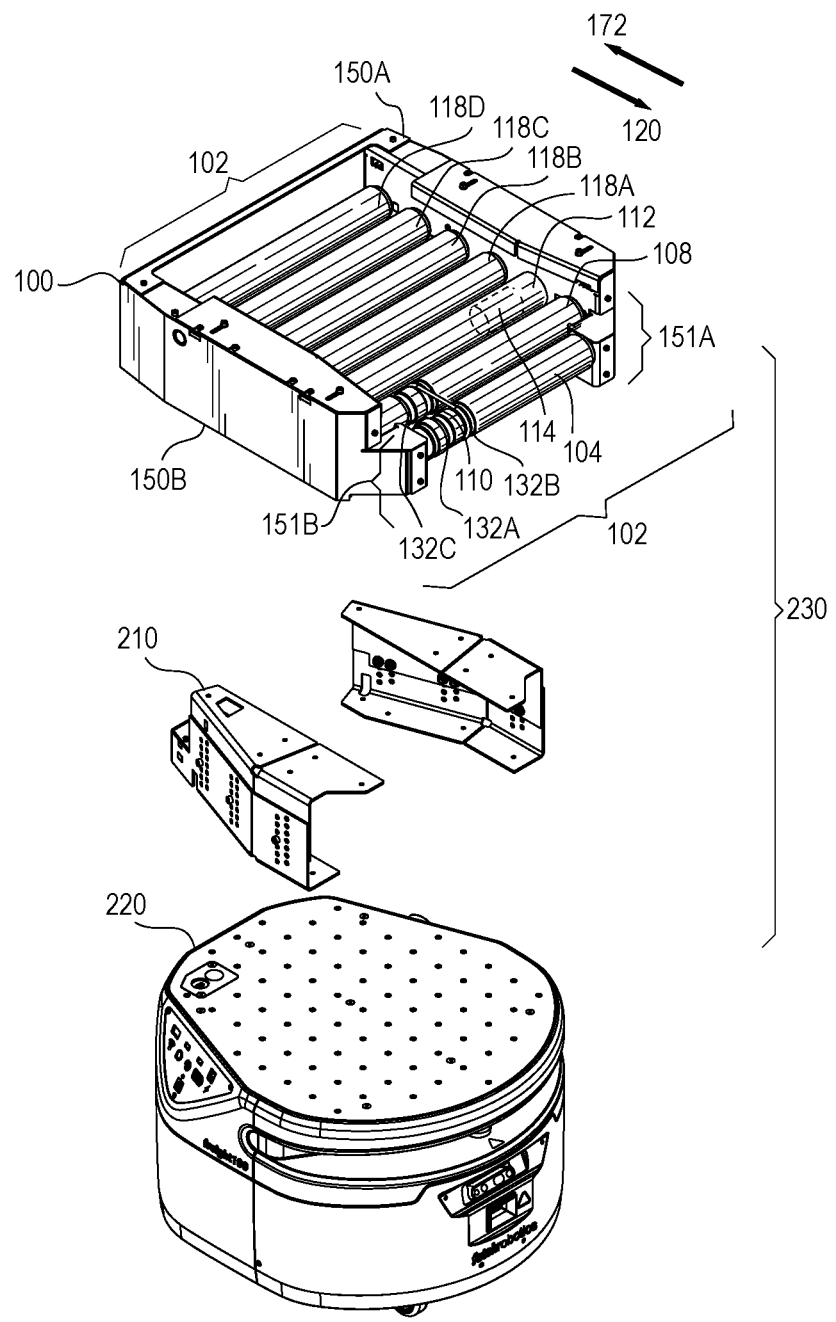

ROBOTIC PAYLOAD TRANSPORT SYSTEM

PRIORITY CLAIM

The present application claims the priority benefit of U.S. provisional patent application No. 62/817,437 filed Mar. 12, 2019 and entitled "Hybrid Belt Transmission for Conveyor for Transport of a Mobile Robot," the disclosure of which is incorporated herein by reference.

SUMMARY

Embodiments of the invention relate in general to the transport of a payload by Autonomous Mobile Robots (AMRs) using a roller conveyor. More specifically, embodiments of the invention relate to the transport of the payload by a robot. More specifically, embodiments of the invention relate to a conveyor for transport of the payload by the robot. More specifically, embodiments of the invention relate to a hybrid power transmission for a conveyor for transport of the payload by the robot. Still more specifically, embodiments of the invention relate to the hybrid power transmission for the conveyor for transport of the payload by a mobile robot.

A roller conveyor system configured for installation on top of a mobile robot to provide robotic transport of a payload includes: a roller conveyor, the roller conveyor comprising: a roller assembly, the roller assembly comprising a plurality of rollers, the rollers configured to move a payload, each of the rollers being configured to rotate, the roller assembly comprising a motorized roller and one or more auxiliary rollers, the motorized roller comprising a motor configured to cause the motorized roller to rotate; and a hybrid power transmission configured to drive the rollers, the hybrid power transmission coupling the motorized roller to at least one of the one or more auxiliary rollers, the hybrid power transmission using at least two power transmission methods.

A roller conveyor system configured for installation on top of a mobile robot to provide robotic transport of a payload includes: a roller conveyor, the roller conveyor comprising: a roller assembly comprising a plurality of rollers, the rollers configured to move a payload, each of the rollers being configured to rotate, the roller assembly comprising a leading roller positioned nearest to a front side of the roller conveyor, the leading roller having a leading roller length, the roller assembly further comprising a motorized roller, the motorized roller comprising a motor configured to cause the motorized roller to rotate, the motorized roller having a motorized roller length; and a drive configured to drive the rollers, the drive coupling the motorized roller to the leading roller, wherein the leading roller length is less than one or more of the secondary roller length, the motorized roller length, and the respective auxiliary roller lengths.

A roller conveyor system configured for installation on top of a mobile robot to provide robotic transport of a payload, includes: a roller conveyor, the roller conveyor comprising: a roller assembly comprising a plurality of rollers rotating in a same direction, the rollers configured to move a payload toward a front side of the roller conveyor, each of the rollers being configured to rotate, the roller assembly comprising a leading roller positioned nearest to a front side of the roller conveyor, the leading roller having a leading roller length, the roller assembly further comprising a motorized roller, the motorized roller comprising a motor configured to cause the motorized roller to rotate, the motorized roller having a motorized roller length, the roller assembly further comprising one or more auxiliary rollers, the auxiliary rollers being adjacent to and behind the motorized roller, each of the auxiliary rollers having a respective auxiliary roller length, the motorized roller being physically coupled to the one or more auxiliary rollers by one or more poly-V belts, the roller assembly further comprising a secondary roller physically coupled to the motorized roller by a poly-V belt, the secondary roller also physically coupled to the leading roller by an O-ring belt, the secondary roller positioned adjacent to and immediately behind the leading roller, the secondary roller having a secondary roller length, wherein the motorized roller is positioned adjacent to and immediately behind the secondary roller, wherein the leading roller length is less than the secondary roller length, the leading roller length is less than the motorized roller length, and the leading roller length is less than each of the respective auxiliary roller lengths; a backstop operably connected to the roller assembly at a back side of the conveyor, the backstop configured to stop motion of the payload toward the back side of the conveyor; and a hybrid belt drive configured to drive the rollers, the drive coupling the motorized roller to the leading roller; and a riser assembly configured to support the roller conveyor, the riser assembly comprising an actuator usable to adjust a height of the roller conveyor above the mobile robot.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

FIGS. 1A-1F are a set of six drawings of a robotic payload conveyor depicting components and subassemblies of the conveyor.

FIGS. 2A-2E are a set of five drawings of the robotic payload transport system.

DETAILED DESCRIPTION

Figure 1B:
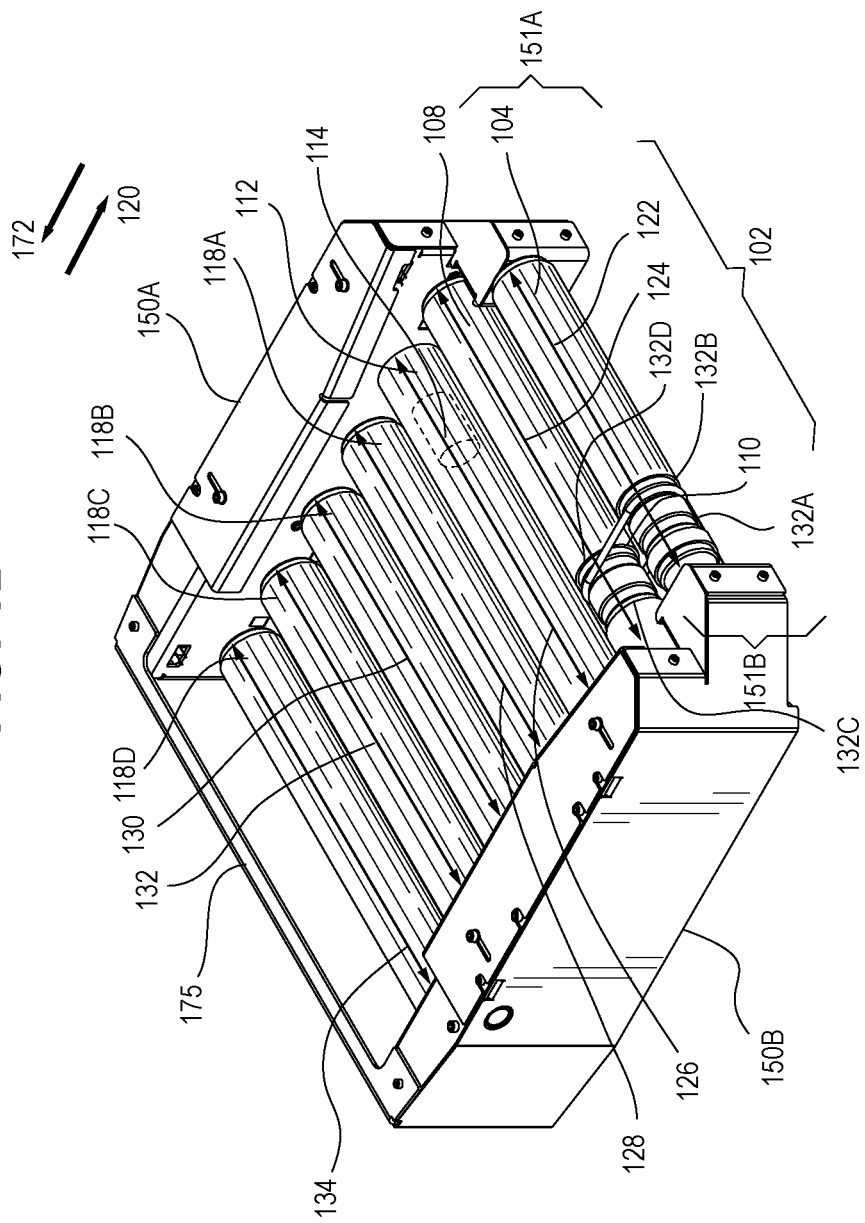

This invention relates to a system for transport of a payload by mobile robots in an industrial setting, and entails industrial control and automation, industrial safety, and industrial conveyor systems.

A robotic payload transport system comprises a robotic payload roller conveyor.

The system comprises a plurality of rollers. For example, the system comprises a leading roller positioned near a front side of the roller conveyor, a secondary roller positioned adjacent to and immediately behind the leading roller, a motorized roller, and a plurality of auxiliary rollers. For example, the plurality of auxiliary rollers are positioned closer to a back side of the roller conveyor than the motorized roller. For example, the system comprises four auxiliary rollers. A motorized roller comprises a built-in gear motor. According to certain embodiments, the motorized roller is coupled to other rollers via a hybrid power transmission that uses a combination of power transmission methods to enable the mechanism to manipulate payloads when mounted on a mobile robot.

The gear motor causes the motorized roller to rotate. Since the motorized roller is linked to the other rollers via the hybrid power transmission, all the rollers rotate, thereby rolling the payload either onto the robot in a loading operation or rolling the payload off of the robot in an unloading operation. For example, a leading roller is coupled to a secondary roller using an O-ring belt. An O-ring belt comprises a round belt. The O-ring belt can be stretched so that a belt tensioner is not required. The O-ring belts are configured to be held in an O-ring groove on the roller. The O-ring groove is configured to accommodate the O-ring belt. The O-ring groove is further configured to prevent the O-ring belt from moving from side to side on the roller. The secondary roller is coupled to the motorized roller using a poly-V belt.

For example, five poly-V belts couple the four auxiliary rollers, the motorized roller, and the secondary roller. The poly-V belt comprises a power transmission belt. The poly-V belt comprises a plurality of longitudinal ribs. The poly-V belt connects two adjacent rollers, for example, a secondary roller and a first auxiliary roller, or the first auxiliary roller and a second auxiliary roller, via poly-V hubs comprised in the two adjacent rollers. Alternatively, or additionally, the poly-V belt connects rollers that are not adjacent. For example, the poly-V hub comprises a plurality of concentric grooves. For example, the poly-V hub comprises approximately ten concentric grooves. The poly-V hub is configured to transmit power between adjacent rollers that are coupled by the poly-V belt. The poly-V belt transmits torque by contact between one or more of the ribs comprised in the poly-V belt and one or more of the grooves comprised in the poly-V hub. The motorized roller is coupled, either directly or indirectly, to one or more auxiliary rollers using one or more poly-V belts. To achieve this, the secondary roller uses both an O-ring groove and a poly-V hub to link both of these separate power transmission systems into one.

A key innovation is the unprecedented design of the secondary roller, which in certain embodiments, as mentioned, comprises both the poly-V hub for mating with the poly-V belts as well as the O-ring grooves to interface with O-ring belts. The poly-V belts and O-ring belts ensure that when the motorized roller rotates, rotational power is transmitted to the four auxiliary rollers, the secondary roller, and leading roller. Accordingly, when moving a payload, all rollers rotate substantially together in substantially the same direction.

The exact configuration of the O-ring belts and the poly-V belts can vary in a number of different configurations while remaining within the confines of the invention. In certain configurations, it may be possible to use zero poly-V belts. In certain configurations, it may be possible to use zero O-ring belts. Moreover, many other methods of power transmission can also be used in addition to or as alternatives to one or more of O-ring belts and poly-V belts. Alternative methods of power transmission usable by embodiments of the invention include, in addition to one or more of O-ring belts and poly-V belts, roller chains, timing belts, round belts, V-belts, flat belts, line shafts, and gears.

FIGS. 1A-1F are a set of six drawings of a robotic payload conveyor depicting components and subassemblies of the conveyor.

FIG. 1A depicts an exploded view of principal components of a robotic payload conveyor 100. The conveyor 100 comprises a conveyor belt roller assembly 102.

The roller assembly 102 comprises a leading roller 104 that is configured to rotate and is, as its name suggests, is positioned nearest to a front side 106 of the conveyor 100, that is, as the roller 104 that is closest to the front side 106. As such, the leading roller 104 comprises the roller 104 that is a first contact when a payload (not shown in this figure) is unloaded off of a robot (not shown in this figure) onto the conveyor 100. Alternatively, or additionally, the leading roller 104 comprises the roller 104 that is a last contact when a payload (not shown in this figure) is loaded onto the robot (not shown in this figure) off the conveyor 100.

The roller assembly 102 further comprises a secondary roller 108 that is configured to rotate and is positioned adjacent to and immediately behind the leading roller 104. The secondary roller 108 is coupled, either directly or indirectly, to the leading roller 104. For example, and as depicted, the secondary roller is physically coupled to the leading roller 104. For example, and as depicted, the secondary roller 108 is coupled to the leading roller 104 by an O-ring belt 110.

The roller assembly 102 further comprises a motorized roller 112 that is configured to rotate and is positioned adjacent to and immediately behind the secondary roller 108. The motorized roller 112 comprises a motor 114, the motor configured to cause the motorized roller 112 to rotate and thereby to cause any other rollers 104, 108 coupled to the motorized roller 112 to also rotate. For example, the motor 114 comprises a gear motor 114. The motorized roller 112 is coupled to the secondary roller 108 by a first poly-V belt 116A.

The first poly-V belt 116A comprises a power transmission belt 116A. The first poly-V belt 116A comprises a plurality of longitudinal ribs (not shown). The secondary roller 108 comprises a secondary poly-V hub 117A. The motorized roller 112 comprises a motorized poly-V hub 117A. The first poly-V belt 116A connects two adjacent rollers, the secondary roller 108 and the motorized roller 112, via poly-V hubs comprised in the two adjacent rollers, namely, via a secondary poly-V hub 117A and a motorized poly-V hub 117B. Alternatively, or additionally, the first poly-V belt 116A connects rollers that are not adjacent.

The secondary roller 108 comprises the secondary poly-V hub 117A. The motorized roller 112 further comprises the motorized poly-V hub 117B. For example, the secondary poly-V hub 117A comprises approximately ten concentric grooves (not shown). For example, the motorized poly-V hub 117B comprises approximately ten concentric grooves (not shown). The first poly-V belt 116A connects the two adjacent rollers, the secondary roller 108 and the motorized roller 112, via the secondary poly-V hub 117A comprised in the secondary roller 108 and the motorized poly-V hub 117B comprised in the motorized roller 112.

Like all the poly-V hubs 117A-117F, the secondary poly-V hub 117A and the motorized poly-V hub 117A are configured to transmit power between adjacent rollers. In the case of the secondary poly-V hub 117A and the motorized poly-V hub 117B, power is transmitted between the secondary roller 108 and the motorized roller 112, the secondary roller 108 and the motorized roller 112 being coupled by the first poly-V belt 116A. The first poly-V belt 116A transmits torque by contact between one or more of the ribs (not shown) comprised in the first poly-V belt 116A and one or more of the grooves (not shown) comprised in the secondary poly-V hub 117A.

The roller assembly 102 further comprises a plurality of auxiliary rollers 118A, 118B, 118C, 118D, each of the auxiliary rollers 118A-118D being configured to rotate, the auxiliary rollers 118A-118D being positioned adjacent to and immediately behind the motorized roller 112.

Each of the rollers 104, 108, 112, 118A-118D further comprises a respective shaft 119A-119G on which the respective roller 104, 108, 112, 118A-118D rotates. For example, the shafts 119A-119G each comprise a hexagonal shaft 119A-119G.

Alternatively, or additionally, at least one of the shafts 119A-119G is non-hexagonal. For example, at least one of the shafts 119A-119G comprises a non-hexagonal shaft 119A-119G. The roller assembly 102 therefore comprises a plurality of rollers 104, 108, 112, 118A-118D, each of the plurality of rollers 104, 108, 112, 118A-118D preferably being configured to rotate. Alternatively, at least of the plurality of rollers 104, 108, 112, 118A-118D is not configured to rotate.

For example, the leading roller 104 comprises a leading hexagonal shaft 119A on which the leading roller 104 rotates. For example, the secondary roller 108 comprises a secondary hexagonal shaft 119B on which it rotates. For example, the motorized roller 112 comprises a motorized hexagonal shaft 119C on which it rotates. For example, each of the four auxiliary rollers 118A-118D comprises a respective first, second, third, or fourth auxiliary hexagonal shaft 119D-119G on which it rotates. Preferably, but not necessarily, the rollers 104, 108, 112, 118A-118D all rotate in a same direction, either all clockwise (with respect to a selected reference point) or all counter-clockwise (with respect to the reference point).

The plurality of rollers 104, 108, 112, 118A-118D collectively form the roller assembly 102 configured to move a payload (not shown in FIG. 1A) along the conveyor 100 in a forward direction 120 toward the front side 106 of the conveyor 100. Alternatively, or additionally, as discussed below, the roller assembly 102 is configured to move the payload (not shown in FIG. 1A) along the conveyor 100 in a backward direction. The roller assembly 102 is depicted in more detail in FIG. 1C.

Each of the auxiliary rollers 118A-118D comprises a respective poly-V hub 117C-117F. The first auxiliary roller 118A comprises a first auxiliary poly-V hub 117C. The second auxiliary roller 118B comprises a second auxiliary poly-V hub 117D. The third auxiliary roller 118C comprises a third auxiliary poly-V hub 117E. The fourth auxiliary roller 118D comprises a fourth auxiliary poly-V hub 117F.

For example, the first auxiliary poly-V hub 117C comprises approximately ten concentric grooves (not shown). For example, the second auxiliary poly-V hub 117D comprises approximately ten concentric grooves (not shown). For example, the third auxiliary poly-V hub 117E comprises approximately ten concentric grooves (not shown). For example, the fourth auxiliary poly-V hub 117F comprises approximately ten concentric grooves (not shown). The first poly-V belt 116A connects the two adjacent rollers, the secondary roller 108 and the motorized roller 112, via the secondary poly-V hub 117A comprised in the secondary roller 108 and the motorized poly-V hub 117B comprised in the motorized roller 112.

The leading roller 104 has a leading roller length 122. The secondary roller 108 has a secondary roller length 124. The motorized roller 112 has a motorized roller length 126. The auxiliary rollers 118A-118D have respective auxiliary roller lengths 130A-130D. For example, the leading roller length 122 is less than the motorized roller length 126. For example, the leading roller length 122 is less than one or more of the secondary roller length 124, the motorized roller length 126, and the respective auxiliary roller lengths 130A-130D. As depicted, the leading roller length 122 is less than the secondary roller length 124, the leading roller length 122 is less than the motorized roller length 126, and the leading roller length 122 is less than each of the respective auxiliary roller lengths 130A-130D.

The small leading roller length 122 is helpful because it allows the robot (not shown in this figure) carrying the conveyor 100 to approach a payload transfer point more closely than it would otherwise be able to do. When executing a transfer of the payload (not shown in this figure) between the conveyor 100 and another device (not shown in this figure), which in practical terms means a transfer of the payload (not shown in this figure) between the leading roller 104 and another device (not shown in this figure), the closer the leading roller 104 is to the other device (not shown in this figure), the smoother and more reliable the transfer will be. This feature is shown in detail in FIG. 4 below.

The leading roller 104 comprises a first leading O-ring groove 132A, the first leading O-ring groove 132A configured to accommodate an O-ring belt (this O-ring belt is not shown in this figure). The leading roller 104 further comprises a second leading O-ring groove 132B, the second leading O-ring groove 132B configured to accommodate the O-ring belt 110. Although as depicted, the first leading O-ring groove does not comprise an O-ring belt, alternative embodiments use two O-ring belts in order to transmit increased power between the leading roller 104 and the secondary roller 108. The O-ring belt 110 comprises a generally round belt 110. Preferably, but not necessarily, the O-ring belt 110 comprises an elastic material, for example, polyurethane. Preferably, but not necessarily, the O-ring belt 110 can be stretched so that a belt tensioner is not required. The second leading O-ring groove 132B is further configured to prevent the O-ring belt 110 from moving from side to side on the leading roller 104. Preferably, but not necessarily, the O-ring belt 110 is configured to be held on the primary roller 104 by the second leading O-ring groove 132B.

The secondary roller 108 comprises a first secondary O-ring groove 132C, the first secondary O-ring groove 132C configured to accommodate an O-ring belt (this O-ring belt is not shown in this figure). The first secondary O-ring groove 132C is further configured to prevent the O-ring belt 110 from moving from side to side on the secondary roller 108. The secondary roller 108 further comprises a second secondary O-ring groove 132D, the second secondary O-ring groove 132B configured to accommodate the O-ring belt 110.

The O-ring belt 110 is attached to the secondary roller 108 using the second secondary O-ring groove 132D. The secondary roller 108 is coupled to the motorized roller 112 using the first poly-V belt 116A. The secondary roller 108 thereby is configured to receive mechanical power from the motorized roller 112 via the first poly-V belt 116A. The secondary roller 108 thereby is further configured to transmit mechanical power to the leading roller 104 via the O-ring belt 110.

The motorized roller 112 is coupled, either directly or indirectly, to one or more auxiliary rollers 118A-118D. For example, and as depicted, the secondary roller 112 is physically coupled to the first auxiliary roller 118A. For example, and as depicted, the secondary roller 108 is physically coupled to the leading roller 104 by an O-ring belt 110.

As depicted, the motorized roller 112 is physically coupled to the auxiliary rollers 118A-118D by one or more poly-V belts, in this case, by four poly-V belts 116B-116E.

The second poly-V belt 116B comprises a power transmission belt 116B. The second poly-V belt 116B comprises a plurality of longitudinal ribs (not shown). The second poly-V belt 116B connects two adjacent rollers, the motorized roller 112 and the first auxiliary roller 118A, via poly-V hubs comprised in the two adjacent rollers, namely, via the motorized poly-V hub 117B and the first auxiliary poly-V hub 117C. Alternatively, or additionally, the second poly-V belt 116B connects rollers that are not adjacent.

The secondary roller 108 again comprises the secondary poly-V hub 117A. The motorized roller 112 comprises a motorized poly-V hub 117B. For example, the secondary poly-V hub 117A comprises approximately ten concentric grooves (not shown). For example, the motorized poly-V hub 117B comprises approximately ten concentric grooves (not shown). The third poly-V belt 116C connects the two adjacent rollers, the first auxiliary roller 118A and the second auxiliary roller 118B, via the first auxiliary poly-V hub 117C comprised in the first auxiliary roller 118A and the second auxiliary poly-V hub 117D comprised in the second auxiliary roller 118B.

Like all the poly-V hubs 117A-117F, the first auxiliary poly-V hub 117C and the second auxiliary poly-V hub 117D are configured to transmit power between adjacent rollers. In the case of the secondary poly-V hub 117A and the motorized poly-V hub 117B, power is transmitted between the secondary roller 108 and the motorized roller 112, the secondary roller 108 and the motorized roller 112 being coupled by the first poly-V belt 116A. The first poly-V belt 116A transmits torque by contact between one or more of the ribs (not shown) comprised in the first poly-V belt 116A and one or more of the grooves (not shown) comprised in the secondary poly-V hub 117A.

A parallel description describes the fourth poly-V belt 116D, which connects the second auxiliary roller 118B and the third auxiliary roller 118C. A parallel description also described the fifth poly-V belt 116E, which connects the third auxiliary roller 118C and the fourth auxiliary roller 118D.

The robotic payload conveyor 100 further comprises a left side assembly 150A and a right side assembly 150B. The left side assembly 150A is located on a left side 152A of the conveyor 100, and the right side assembly 150B is located on a right side 152B of the conveyor 100.

The roller assembly 102 is operably connected to the left side assembly 150A. The roller assembly is operably connected to the right side assembly 150B. More specifically, at least one of the left side assembly 150A and the right side assembly 150B hold in place at least one of the plurality of rollers 104, 108, 112, 118A-118D while allowing at least one of the plurality of rollers 104, 108, 112, 118A-118D to rotate. Preferably, but not necessarily, both the left side assembly 150A and the right side assembly 150B hold in place at least one of the plurality of rollers 104, 108, 112, 118A-118D while allowing at least one of the plurality of rollers 104, 108, 112, 118A-118D to rotate. Most preferably, but not necessarily, and as depicted, both the left side assembly 150A and the right side assembly 150B hold in place each of the plurality of rollers 104, 108, 112, 118A-118D while allowing each of the plurality of rollers 104, 108, 112, 118A-118D to rotate. As depicted, the left side assembly 150A comprises a left side assembly bulb 151A and the right side assembly 150B comprises a right side assembly bulb 151B, the left side assembly bulb 151A and the right side assembly bulb 151B together configured to hold the leading roller 104 in place so that the leading roller length 122 is less than one or more of one or more of the secondary roller length 124, the motorized roller length 126, and the respective auxiliary roller lengths 130A-130D. As depicted, the left side assembly bulb 151A extends toward a center of the conveyor 100 so as to shorten the leading roller length 122 relative to the other roller lengths 124, 126, 130A-130D. As depicted, the right side assembly bulb 151B extends toward a center of the conveyor 100 so as to shorten the leading roller length 122 relative to the other roller lengths 124, 126, 130A-130D.

Each of the respective hexagonal shafts 119A-119G is held in place by one or more of the left side assembly 150A and by the right side assembly 150B. (More details are provided in FIG. 1F.) Preferably, but not necessarily, each of the respective hexagonal shafts 119A-119G is held in place by both the left side assembly 150A and the right side assembly 150B. Preferably, but not necessarily, each of the plurality of rollers 104, 108, 112, 118A-118D rotates about the respective hexagonal shaft 119A-119G. Alternatively, or additionally, one or more of the respective hexagonal shafts 119A-119G is free to rotate while being held in place by the left side assembly 150A and by the right side assembly 150B.

The conveyor 100 further comprises a base assembly 160. The base assembly 160 serves as a main structural member of the robotic payload conveyor 100. The base assembly 160 is operably connected to the left side assembly 150A and to the right side assembly 150B. The base assembly 160 supports the left side assembly 150A and the right side assembly 150B. The base assembly 160 is configured to support the roller assembly 102.

The conveyor 100 further comprises an optional backstop 170. The backstop 170 is operably connected to the left side assembly 150A and to the right side assembly 150B. The backstop 170 is configured to stop motion of a payload (not shown in FIG. 1A) in a backward direction 172 toward a back side 175 of the conveyor 100. The backstop 170 thereby allows the conveyor 100 to move the payload (not shown in FIG. 1A) to the back side 175 of the conveyor 100 until the payload contacts the backstop 170. Alternatively, or additionally, the roller assembly 102 is configured to move the payload (not shown in FIG. 1A) along the conveyor 100 in a backward direction. The backstop 170 can be removed.

The rollers 104, 108, 112, 118A-118D are configured to move the payload (not shown in this figure) toward a front side 106 of the roller conveyor. Alternatively, or additionally, the rollers 104, 108, 112, 118A-118D are configured to move the payload (not shown in this figure) toward a back side of the roller conveyor.

Figure 1C:
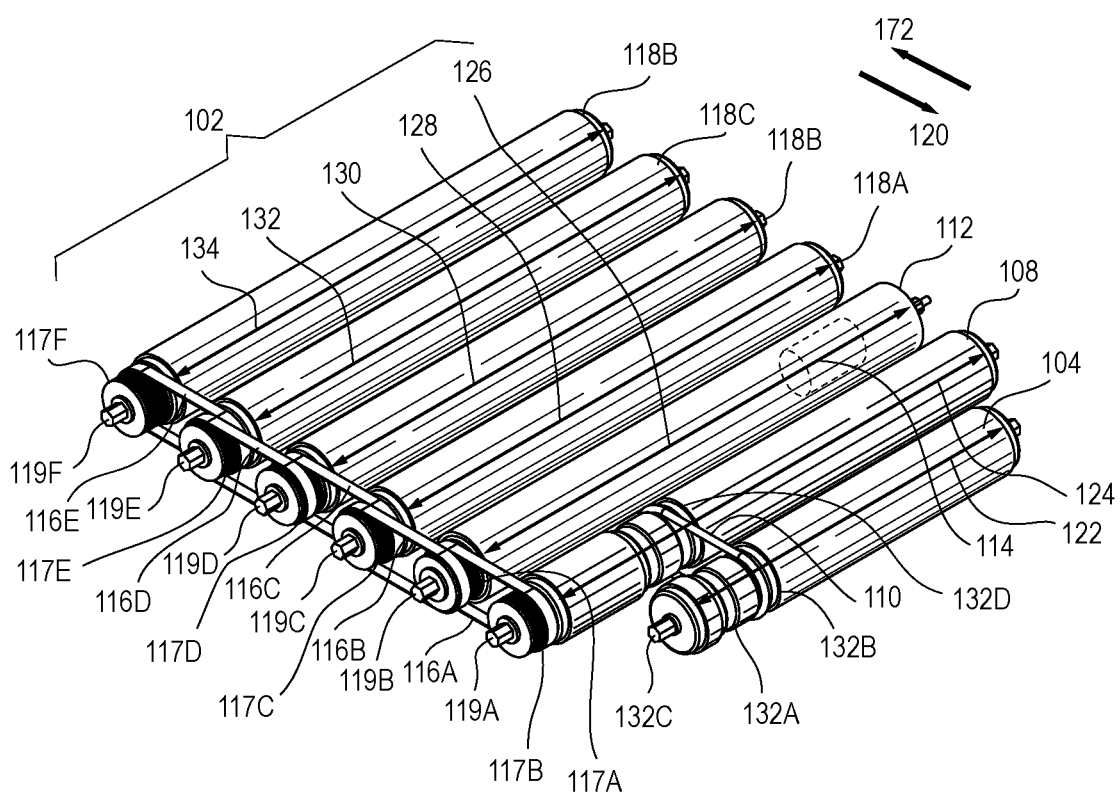
Figure 1D:
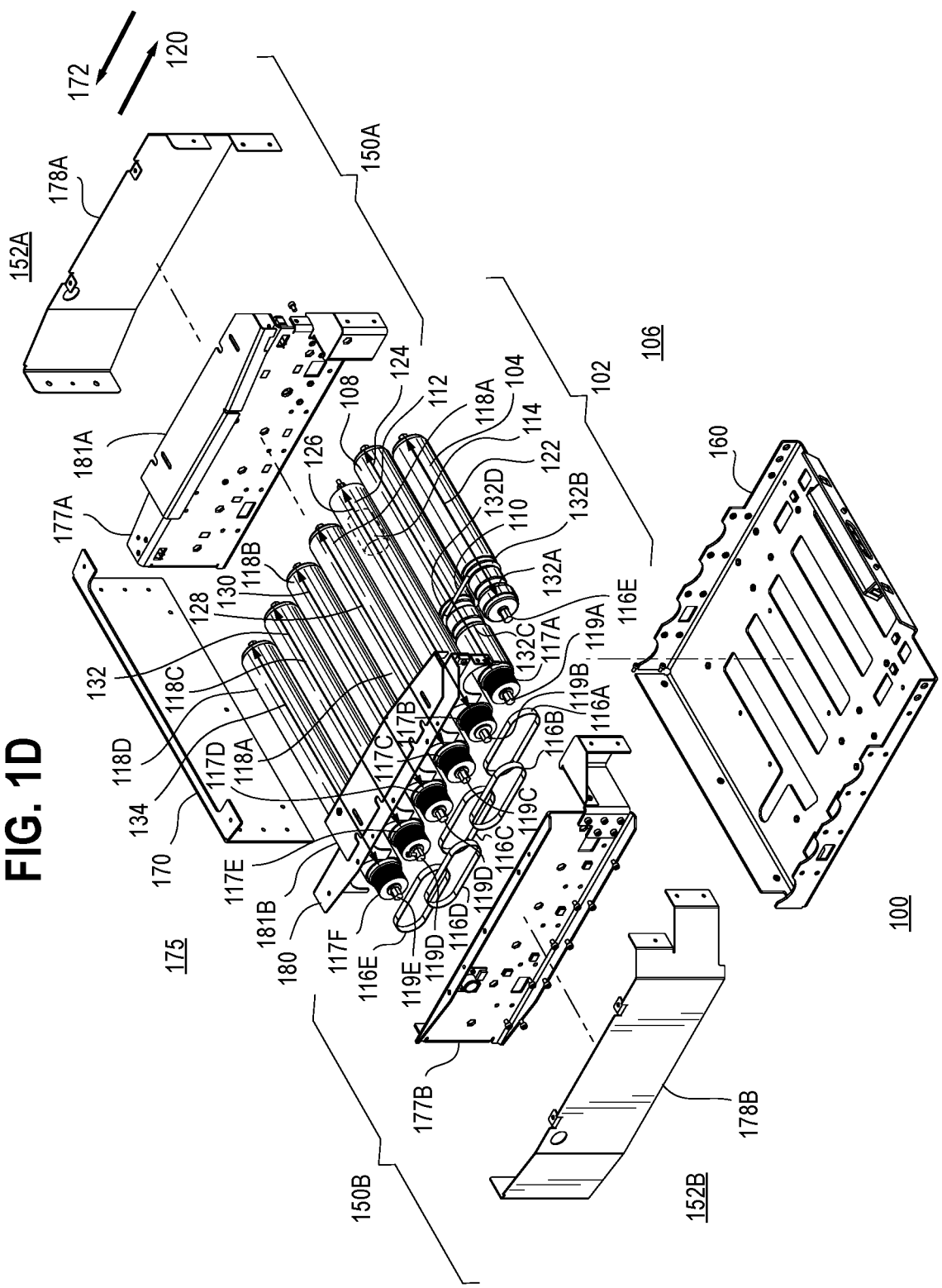
Figure 1E:
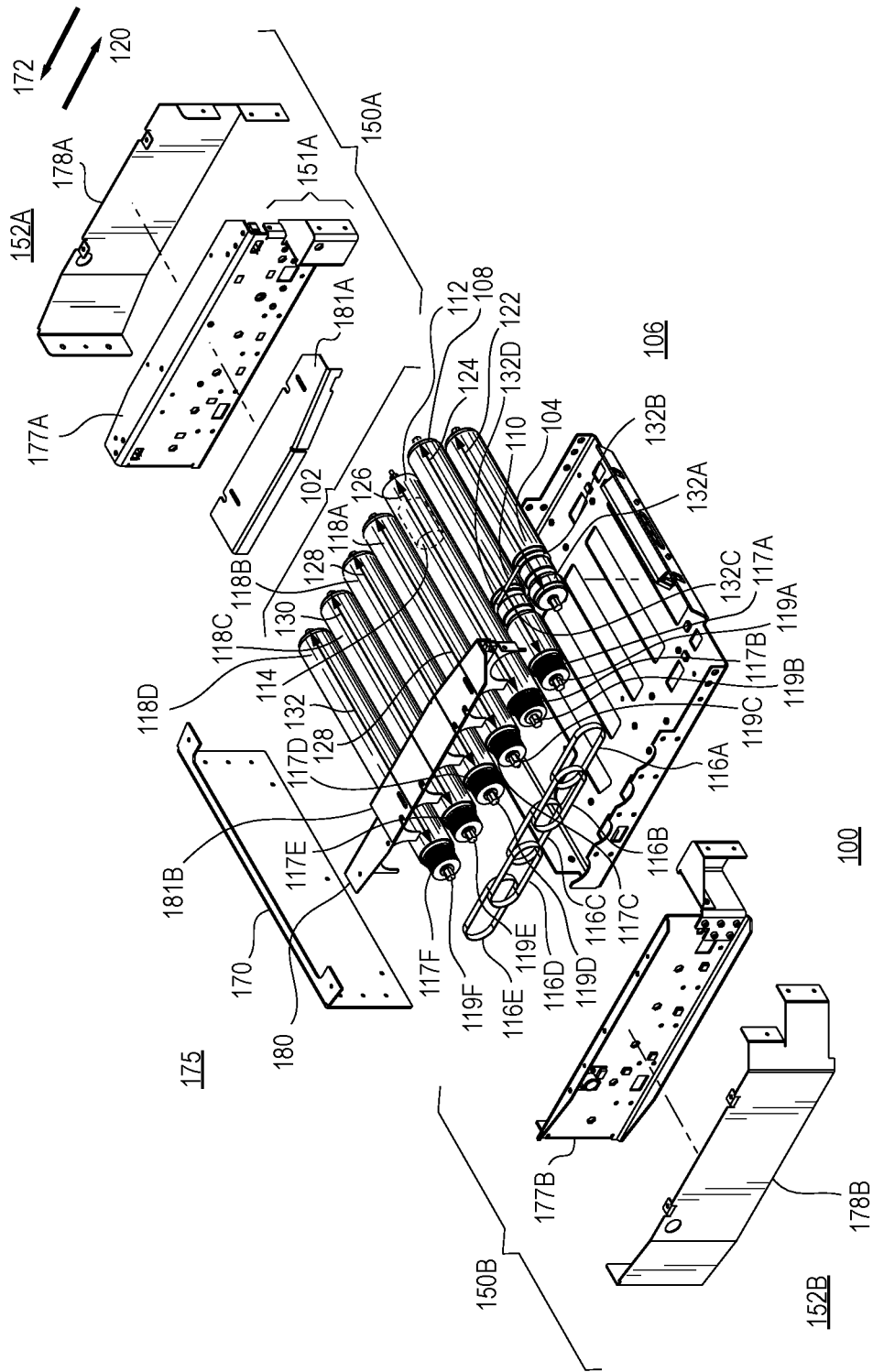
Figure 1F:
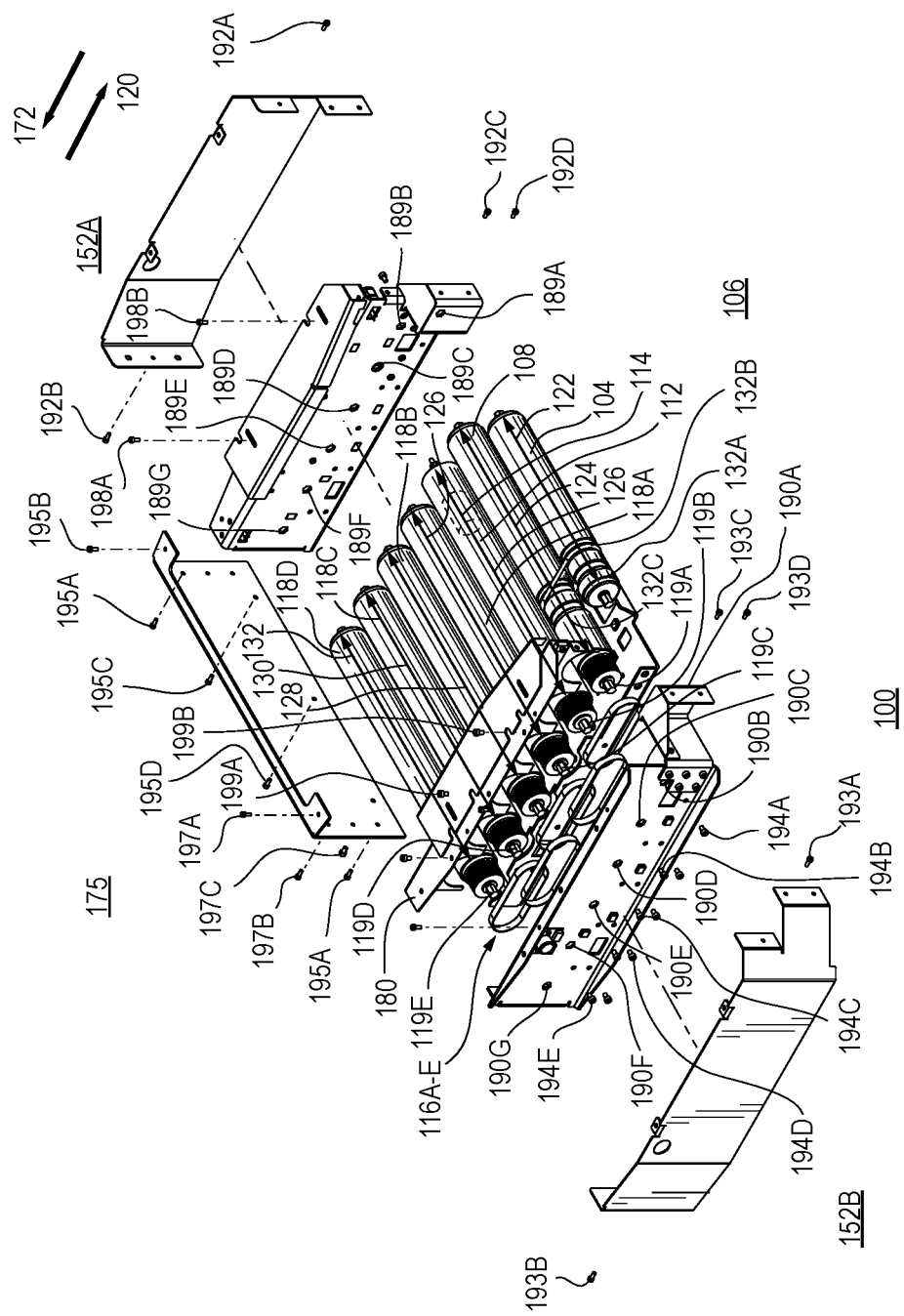

To summarize, the base assembly 160 is fastened to, and supports, both the left side assembly 150A and the right side assembly 150B using fasteners, which are shown in more detail in FIG. 1F. The backstop 170 attaches to the left side assembly 150A and to the right side assembly 150B. Together, these four parts—the base assembly 160, the left side assembly 150A, the right side assembly 150B, and the backstop 170—form a main structure of the conveyor 100. The leading roller 104, the secondary roller 108, the motorized roller 112, and the auxiliary rollers 118A-118D are supported between the left side assembly 150A and the right side assembly 150B by respective hexagonal shafts of each roller 104, 108, 112, 118A-118D which are inserted into holes (not shown in this figure; shown in FIG. 1F) in both the left side assembly 150A and the right side assembly 150B.

FIG. 1B depicts a fully assembled view of the principal components of the conveyor 100. The conveyor 100 again comprises the roller assembly 102. The roller assembly 102 again comprises the leading roller 104, which again is positioned near the front side 106 of the conveyor 100.

The roller assembly 102 again further comprises the secondary roller 108, which is again positioned adjacent to and immediately behind the leading roller 104. The secondary roller 108 again is coupled to the leading roller 104 by the O-ring belt 110.

The roller assembly 102 again further comprises the motorized roller 112, which again is positioned adjacent to and immediately behind the secondary roller 108. The motorized roller 112 again comprises the motor 114. The motorized roller 112 again is coupled to the secondary roller 108 by the first poly-V belt 106A.

The roller assembly 102 again further comprises the plurality of auxiliary rollers 118A, 118B, 118C, 118D, which again are positioned adjacent to and immediately behind the motorized roller 112. The motorized roller 112 is again coupled, either directly or indirectly, to the one or more auxiliary rollers 118A-118D. For example, and as depicted, the secondary roller 112 again is physically coupled to the first auxiliary roller 118A. For example, and as depicted, the secondary roller 108 again is physically coupled to the leading roller 104 by an O-ring belt 110.

The leading roller 104 again has the leading roller length 122. The secondary roller 108 again has the secondary roller length 124. The motorized roller 112 again has the motorized roller length 126. The auxiliary rollers 118A-118D again have the respective auxiliary roller lengths 130A-130D. The leading roller length 122 again is less than the motorized roller length 126. The leading roller length 122 again is less than one or more of the secondary roller length 124, the motorized roller length 126, and the respective auxiliary roller lengths 130A-130D. As depicted, the leading roller length 122 is less than the secondary roller length 124, the leading roller length 122 is less than the motorized roller length 126, and the leading roller length 122 is less than each of the respective auxiliary roller lengths 130A-130D.

The leading roller 104 again comprises the first leading O-ring groove 132A, the first leading O-ring groove 132A again configured to accommodate an O-ring belt (this O-ring belt is not shown in this figure). The leading roller 104 again comprises the second leading O-ring groove 132B, the second leading O-ring groove 132B again configured to accommodate an O-ring belt 110. The second leading O-ring groove 132B is again further configured to prevent the O-ring belt 110 from moving from side to side on the leading roller 104.

The robotic payload conveyor 100 again further comprises the left side assembly 150A and the right side assembly 150B.

The left side assembly 150A and the right side assembly 150B again hold in place each of the plurality of rollers 104, 108, 112, 118A-118D while allowing each of the plurality of rollers 104, 108, 112, 118A-118D to rotate. The left side assembly 150A again comprises the left side assembly bulb 151A and the right side assembly 150B again comprises the right side assembly bulb 151B, the left side assembly bulb 151A and the right side assembly bulb 151B together again configured to hold the leading roller 104 in place so that the leading roller length 122 is less than one or more of one or more of the secondary roller length 124, the motorized roller length 126, and the respective auxiliary roller lengths 130A-130D.

Each of the respective hexagonal shafts 119A-119G is held in place by one or more of the left side assembly 150A and the right side assembly 150B. (More details are provided in FIG. 1F.) Preferably, but not necessarily, each of the plurality of rollers 104, 108, 112, 118A-118D rotates about the respective hexagonal shaft 119A-119G. Alternatively, or additionally, one or more of the respective hexagonal shafts 119A-119G is free to rotate while being held in place by the left side assembly 150A and by the right side assembly 150B.

The roller assembly 102 again is operably connected to the left side assembly 150A. The roller assembly again is operably connected to the right side assembly 150B.

The conveyor 100 again further comprises the base assembly (not shown in this figure). The base assembly (not shown in this figure) again is operably connected to the roller assembly 102.

The conveyor 100 again further comprises the backstop 170. The backstop 170 again is operably connected to the left side assembly 150A and to the right side assembly 150B.

FIG. 1C depicts a fully assembled detail view of components of the roller assembly 102. The roller assembly 102 again comprises the plurality of rollers 104, 108, 112, 118A-118D, each of the plurality of rollers 104, 108, 112, 118A-118D preferably again being configured to rotate. The roller assembly 102 again comprises the leading roller 104 that is configured to rotate, the leading roller 104 again being positioned near the front side 106.

The roller assembly 102 again further comprises the secondary roller 108 that is configured to rotate, the secondary roller 108 again being positioned adjacent to and immediately behind the leading roller 104. The secondary roller 108 again is coupled to the leading roller 104 by the O-ring belt 110.

The roller assembly 102 again further comprises the motorized roller 112 that is configured to rotate, the motorized roller 108 being positioned adjacent to and immediately behind the secondary roller 108. The motorized roller 112 comprises the motor 112 configured to cause the motorized roller 112 to rotate. The motorized roller 112 is again coupled to the secondary roller 108 by the first poly-V belt 116A.

The secondary roller 108 again comprises the secondary poly-V hub 117A. The motorized roller 112 again further comprises the motorized poly-V hub 117B. The first poly-V belt 116A again connects the two adjacent rollers, the secondary roller 108 and the motorized roller 112, via the secondary poly-V hub 117A comprised in the secondary roller 108 and the motorized poly-V hub 117B comprised in the motorized roller 112.

Like all the poly-V hubs 117A-117F, the secondary poly-V hub 117A and the motorized poly-V hub 117A are again configured to transmit power between adjacent rollers. In the case of the secondary poly-V hub 117A and the motorized poly-V hub 117B, power again is transmitted between the secondary roller 108 and the motorized roller 112, the secondary roller 108 and the motorized roller 112 again being coupled by the first poly-V belt 116A.

Each of the auxiliary rollers 118A-118D again comprises the respective poly-V hub 117C-117F. The first auxiliary roller 118A again comprises the first auxiliary poly-V hub 117C. The second auxiliary roller 118B again comprises the second auxiliary poly-V hub 117D. The third auxiliary roller 118C again comprises the third auxiliary poly-V hub 117E. The fourth auxiliary roller 118D again comprises the fourth auxiliary poly-V hub 117F.

The leading roller 104 again has the leading roller length 122. The secondary roller 108 again has the secondary roller length 124. The motorized roller 112 again has the motorized roller length 126. The auxiliary rollers 118A-118D again have the respective auxiliary roller lengths 130A-130D. The leading roller length 122 again is less than the motorized roller length 126. The leading roller length 122 is less than one or more of the secondary roller length 124, the motorized roller length 126, and the respective auxiliary roller lengths 130A-130D. As depicted, the leading roller length 122 is less than the secondary roller length 124, the leading roller length 122 is less than the motorized roller length 126, and the leading roller length 122 is less than each of the respective auxiliary roller lengths 130A-130D.

The small leading roller length 122 is helpful because it allows the robot (not shown in this figure) carrying the conveyor 100 to approach a payload transfer point more closely than it would otherwise be able to do. When executing a transfer of the payload (not shown in this figure) between the conveyor 100 and another device (not shown in this figure), which in practical terms means a transfer of the payload (not shown in this figure) between the leading roller 104 and another device (not shown in this figure), the closer the leading roller 104 is to the other device (not shown in this figure), the smoother and more reliable the transfer will be. This feature is shown in detail in FIG. 4 below.

The leading roller 104 again comprises the first leading O-ring groove 132A, the first leading O-ring groove 132A configured to accommodate an O-ring belt (this O-ring belt is not shown in this figure). The leading roller 104 further comprises the second leading O-ring groove 132B, the second leading O-ring groove 132B configured to accommodate the O-ring belt 110. The second leading O-ring groove 132B is again further configured to prevent the O-ring belt 110 from moving from side to side on the leading roller 104. The secondary roller 108 again comprises the first secondary O-ring groove 132C. The secondary roller 108 again comprises the second secondary O-ring groove 132D, the second secondary O-ring groove 132B again configured to accommodate the O-ring belt 110.

The O-ring belt 110 again is attached to the secondary roller 108 using the second secondary O-ring groove 132D. The secondary roller 108 again is coupled to the motorized roller 112 using the first poly-V belt 116A. The secondary roller 108 thereby is configured to receive mechanical power from the motorized roller 112 via the first poly-V belt 116A. The secondary roller 108 thereby is further configured to transmit mechanical power to the leading roller 104 via the O-ring belt 110.

The secondary roller 108 again comprises the secondary poly-V hub 117A. The motorized roller 112 comprises the motorized poly-V hub 117B. The third poly-V belt 116C connects the two adjacent rollers, the first auxiliary roller 118A and the second auxiliary roller 118B, via the first auxiliary poly-V hub 117C comprised in the first auxiliary roller 118A and the second auxiliary poly-V hub 117D comprised in the second auxiliary roller 118B.

A parallel description again describes the fourth poly-V belt 116D, which connects the second auxiliary roller 118B and the third auxiliary roller 118C. A parallel description also described the fifth poly-V belt 116E, which connects the third auxiliary roller 118C and the fourth auxiliary roller 118D.

The roller assembly 102 again further comprises the plurality of auxiliary rollers 118A, 118B, 118C, 118D, each of the auxiliary rollers 118A-118D being configured to rotate, the auxiliary rollers 118A-118D being positioned adjacent to and immediately behind the motorized roller 112. The motorized roller 112 is again coupled, either directly or indirectly, to the one or more auxiliary rollers 118A-118D. For example, and as depicted, the secondary roller 112 again is physically coupled to the first auxiliary roller 118A. For example, and as depicted, the secondary roller 108 again is physically coupled to the leading roller 104 by an O-ring belt 110.

Each of the rollers 104, 108, 112, 118A-118D again further comprises the respective hexagonal shaft 119A-119G on which the respective roller 104, 108, 112, 118A-118D rotates. The leading roller 104 again comprises the leading hexagonal shaft 119A on which the leading roller 104 rotates. The secondary roller 108 again comprises the secondary hexagonal shaft 119B on which it rotates. The motorized roller 112 again comprises the motorized hexagonal shaft 119C on which it rotates. Each of the four auxiliary rollers 118A-118D again comprises the respective first, second, third, or fourth auxiliary hexagonal shaft 119D-119G on which it rotates.

The first auxiliary roller 118A is again coupled to the second auxiliary roller 118B by the second poly-V belt 116B.

The leading roller 104 again has the leading roller length 122. The secondary roller 108 again has the secondary roller length 124. The motorized roller 112 again has the motorized roller length 126. The auxiliary rollers 118A-118D again have the respective auxiliary roller lengths 130A-130D.

FIG. 1D depicts an exploded view of principal and secondary components of the robotic payload conveyor 100. The conveyor 100 again comprises the conveyor belt roller assembly 102. The roller assembly 102 again comprises the plurality of rollers 104, 108, 112, 118A-118D, each of the plurality of rollers 104, 108, 112, 118A-118D again preferably being configured to rotate. The plurality of rollers 104, 108, 112, 118A-118D again collectively form the roller assembly 102 configured to move the payload (not shown in FIG. 1D) along the conveyor 100 in the forward direction 120 toward the front side 106 of the conveyor 100. The roller assembly 102 again comprises the leading roller 104 that is again configured to rotate, the leading roller 104 again being positioned near the front side 106 of the conveyor 100.

As mentioned above in the discussion of FIG. 1A, when executing the transfer of the payload (not shown in this figure) between the conveyor 100 and another device (not shown in this figure), which in practical terms means the transfer of the payload (not shown in this figure) between the leading roller 104 and another device (not shown in this figure), the closer the leading roller 104 is to the other device (not shown in this figure), the smoother and more reliable the transfer will be.

The leading roller 104 again comprises the first leading O-ring groove 132A, the first leading O-ring groove 132A again configured to accommodate an O-ring belt (this O-ring belt is not shown in this figure). The leading roller 104 again comprises the second leading O-ring groove 132B, the second leading O-ring groove 132B again configured to accommodate an O-ring belt 110. The second leading O-ring groove 132B is again further configured to prevent the O-ring belt 110 from moving from side to side on the leading roller 104.

The roller assembly 102 again further comprises the secondary roller 108 that is again configured to rotate, the secondary roller 108 again being positioned adjacent to and immediately behind the leading roller 104.

The leading roller 104 again comprises the first leading O-ring groove 132A, the first leading O-ring groove 132A configured to accommodate an O-ring belt (this O-ring belt is not shown in this figure). The leading roller 104 further comprises the second leading O-ring groove 132B, the second leading O-ring groove 132B configured to accommodate the O-ring belt 110. The second leading O-ring groove 132B is again further configured to prevent the O-ring belt 110 from moving from side to side on the leading roller 104. The secondary roller 108 again comprises the first secondary O-ring groove 132C. The secondary roller 108 again comprises the second secondary O-ring groove 132D, the second secondary O-ring groove 132B again configured to accommodate the O-ring belt 110.

The O-ring belt 110 again is attached to the secondary roller 108 using the second secondary O-ring groove 132D.

The secondary roller 108 is again coupled to the leading roller 104 by the O-ring belt 110. The secondary roller 108 is again coupled to the motorized roller 112 by the first poly-V belt 116A.

The roller assembly 102 again further comprises the motorized roller 112 that is configured to rotate, the motorized roller 108 again being positioned adjacent to and immediately behind the secondary roller 108. The motorized roller 112 again comprises the motor 114 configured to cause the motorized roller 112 to rotate. The motorized roller 112 again is coupled to the secondary roller 108 by the first poly-V belt 116A.

The roller assembly 102 again further comprises the plurality of auxiliary rollers 118A, 118B, 118C, 118D, the auxiliary rollers 118A-118D again being positioned adjacent to and immediately behind the motorized roller 112. The motorized roller 112 is again coupled, either directly or indirectly, to the one or more auxiliary rollers 118A-118D. For example, and as depicted, the secondary roller 112 again is physically coupled to the first auxiliary roller 118A. For example, and as depicted, the secondary roller 108 again is physically coupled to the leading roller 104 by an O-ring belt 110.

Each of the rollers 104, 108, 112, 118A-118D again further comprises the respective hexagonal shaft 119A-119G on which the respective roller 104, 108, 112, 118A-118D rotates. The leading roller 104 again comprises the leading hexagonal shaft 119A on which the leading roller 104 rotates. The secondary roller 108 again comprises the secondary hexagonal shaft 119B on which it rotates. The motorized roller 112 again comprises the motorized hexagonal shaft 119C on which it rotates. Each of the four auxiliary rollers 118A-118D again comprises the respective first, second, third, or fourth auxiliary hexagonal shaft 119D-119G on which it rotates.

The robotic payload conveyor 100 again further comprises the left side assembly 150A and the right side assembly 150B. The left side assembly 150A and the right side assembly 150B again hold in place each of the plurality of rollers 104, 108, 112, 118A-118D while allowing each of the plurality of rollers 104, 108, 112, 118A-118D to rotate. The left side assembly 150A again comprises the left side assembly bulb 151A and the right side assembly 150B again comprises the right side assembly bulb 151B, the left side assembly bulb 151A and the right side assembly bulb 151B together again configured to hold the leading roller 104 in place so that the leading roller length 122 is less than one or more of one or more of the secondary roller length 124, the motorized roller length 126, and the respective auxiliary roller lengths 130A-130D.

Each of the respective hexagonal shafts 119A-119G is held in place by the left side assembly 150A and by the right side assembly 150B. (More details are provided in FIG. 1F.) Preferably, but not necessarily, each of the plurality of rollers 104, 108, 112, 118A-118D rotates about the respective hexagonal shaft 119A-119G. Alternatively, or additionally, one or more of the respective hexagonal shafts 119A-119G is free to rotate while being held in place by the left side assembly 150A and by the right side assembly 150B.

The left side assembly 150A comprises a left side panel 177A and a left side housing 178A. The right side assembly 150B comprises a right side panel 177B and a right side housing 178B. The left side panel 177A and the right side panel 177B are configured to hold the poly-V hubs 117A-117F while allowing the poly-V hubs 117A-117F to freely rotate so that the corresponding poly-V belts 116A-116D can rotate. As depicted, the left side housing 178A is configured to protect one or more of the poly-V hubs 117A-117F and the poly-V belts 116A-116D. As depicted, there are no poly-V hubs 117A-117F on the left side 152A of the conveyor 100 and there are also no poly-V belts 116A-116D on the left side 152A of the conveyor 100. Accordingly, as depicted in this particular example, the right side panel 177B is configured to hold the poly-V hubs 117A-117F while allowing the poly-V hubs 117A-117F to freely rotate so that the corresponding poly-V belts 116A-116D can rotate.

The secondary roller 108 again comprises the secondary poly-V hub 117A. The motorized roller 112 again further comprises the motorized poly-V hub 117B. The first poly-V belt 116A again connects the two adjacent rollers, the secondary roller 108 and the motorized roller 112, via the secondary poly-V hub 117A comprised in the secondary roller 108 and the motorized poly-V hub 117B comprised in the motorized roller 112.

Like all the poly-V hubs 117A-117F, the secondary poly-V hub 117A and the motorized poly-V hub 117A are again configured to transmit power between adjacent rollers. In the case of the secondary poly-V hub 117A and the motorized poly-V hub 117B, power again is transmitted between the secondary roller 108 and the motorized roller 112, the secondary roller 108 and the motorized roller 112 again being coupled by the first poly-V belt 116A.

Each of the auxiliary rollers 118A-118D again comprises the respective poly-V hub 117C-117F. The first auxiliary roller 118A again comprises the first auxiliary poly-V hub 117C. The second auxiliary roller 118B again comprises the second auxiliary poly-V hub 117D. The third auxiliary roller 118C again comprises the third auxiliary poly-V hub 117E. The fourth auxiliary roller 118D again comprises the fourth auxiliary poly-V hub 117F.

The leading roller 104 again comprises the first leading O-ring groove 132A, the first leading O-ring groove 132A configured to accommodate an O-ring belt (this O-ring belt is not shown in this figure). The leading roller 104 further comprises the second leading O-ring groove 132B, the second leading O-ring groove 132B configured to accommodate the O-ring belt 110. The second leading O-ring groove 132B is again further configured to prevent the O-ring belt 110 from moving from side to side on the leading roller 104. The secondary roller 108 again comprises the first secondary O-ring groove 132C. The secondary roller 108 again comprises the second secondary O-ring groove 132D, the second secondary O-ring groove 132B again configured to accommodate the O-ring belt 110.

The O-ring belt 110 again is attached to the secondary roller 108 using the second secondary O-ring groove 132D. The secondary roller 108 is coupled to the motorized roller 112 using the first poly-V belt 116A. The secondary roller 108 thereby is configured to receive mechanical power from the motorized roller 112 via the first poly-V belt 116A. The secondary roller 108 thereby is further configured to transmit mechanical power to the leading roller 104 via the O-ring belt 110.

The secondary roller 108 again comprises the secondary poly-V hub 117A. The motorized roller 112 comprises the motorized poly-V hub 117B. The third poly-V belt 116C connects the two adjacent rollers, the first auxiliary roller 118A and the second auxiliary roller 118B, via the first auxiliary poly-V hub 117C comprised in the first auxiliary roller 118A and the second auxiliary poly-V hub 117D comprised in the second auxiliary roller 118B.

A parallel description again describes the fourth poly-V belt 116D, which connects the second auxiliary roller 118B and the third auxiliary roller 118C. A parallel description also described the fifth poly-V belt 116E, which connects the third auxiliary roller 118C and the fourth auxiliary roller 118D.

The right side assembly 150A further comprises a safety guard 180. The safety guard 180 is configured to cover the poly-V belts 116A-116D to prevent hazards, for example, a hazard to a human of having a finger pinched. Alternatively, or additionally, the safety guard 180 is configured to discourage a human from inserting one or more of a finger and another body part into a position that is near a point where the poly-V belt 116A-116D meets the roller 108, 104, 108, 112, 118A-118D.

The left side assembly 150A further comprises a left roller alignment rail 181A. The right side assembly 150B further comprises a right roller alignment rail 181B. The left and right roller alignment rails 181A-181B are configured to do one or more of cover and protect the roller assembly 102. More specifically, the left and right roller alignment rails 181A-181B are configured to protect one or more of the safety guard 180, the poly-V belts 116A-116D, the poly-V hubs 117A-117F, and the rollers 104, 108, 112, 118A-118D.

The conveyor 100 again further comprises the base assembly 160. The base assembly 160 again serves as a main structural member of the robotic payload conveyor 100. The base assembly 160 again is operably connected to the left side assembly 150A and to the right side assembly 150B. The base assembly 160 again supports the left side assembly 150A and the right side assembly 150B. The conveyor 100 again further comprises the backstop 170. The backstop 170 again is configured to stop motion of the payload (not shown in FIG. 1D) in the backward direction 172 toward the back side 175 of the conveyor 100.

FIG. 1E depicts a further exploded view of principal and secondary components of the robotic payload conveyor 100. The conveyor 100 again comprises the conveyor belt roller assembly 102. The roller assembly 102 again comprises the plurality of rollers 104, 108, 112, 118A-118D, each of the plurality of rollers 104, 108, 112, 118A-118D again preferably being configured to rotate. The plurality of rollers 104, 108, 112, 118A-118D again collectively form the roller assembly 102 configured to move the payload (not shown in FIG. 1D) along the conveyor 100 in the forward direction 120 toward the front side 106 of the conveyor 100. The roller assembly 102 again comprises the leading roller 104 that is again configured to rotate, the leading roller 104 again being positioned near the front side 106 of the conveyor 100.

The leading roller 104 again comprises the first leading O-ring groove 132A. The leading roller 104 again comprises the second leading O-ring groove 132B, the second leading O-ring groove 132B again configured to accommodate the O-ring belt 110. The second leading O-ring groove 132B is again further configured to prevent the O-ring belt 110 from moving from side to side on the leading roller 104.

The roller assembly 102 again further comprises the secondary roller 108 that is again configured to rotate.

The leading roller 104 again comprises the first leading O-ring groove 132A, the first leading O-ring groove 132A configured to accommodate an O-ring belt (this O-ring belt is not shown in this figure). The leading roller 104 further comprises the second leading O-ring groove 132B, the second leading O-ring groove 132B configured to accommodate the O-ring belt 110. The second leading O-ring groove 132B is again further configured to prevent the O-ring belt 110 from moving from side to side on the leading roller 104. The secondary roller 108 again comprises the first secondary O-ring groove 132C. The secondary roller 108 again comprises the second secondary O-ring groove 132D, the second secondary O-ring groove 132B again configured to accommodate the O-ring belt 110.

The O-ring belt 110 is again attached to the secondary roller 108 using the second secondary O-ring groove 132D.

The secondary roller 108 is again coupled to the leading roller 104 by the O-ring belt 110. The secondary roller 108 is again coupled to the motorized roller 112 by the first poly-V belt 116A.

The roller assembly 102 again further comprises the motorized roller 112 that is configured to rotate, the motorized roller 108 again being positioned adjacent to and immediately behind the secondary roller 108. The motorized roller 112 again comprises the motor 114 configured to cause the motorized roller 112 to rotate. The motorized roller 112 again is coupled to the secondary roller 108 by the first poly-V belt 116A.

The roller assembly 102 again further comprises the plurality of auxiliary rollers 118A, 118B, 118C, 118D, the auxiliary rollers 118A-118D again being positioned adjacent to and immediately behind the motorized roller 112. The motorized roller 112 is again coupled, either directly or indirectly, to the one or more auxiliary rollers 118A-118D. For example, and as depicted, the secondary roller 112 again is physically coupled to the first auxiliary roller 118A. For example, and as depicted, the secondary roller 108 again is physically coupled to the leading roller 104 by an O-ring belt 110.

Each of the rollers 104, 108, 112, 118A-118D again further comprises the respective hexagonal shaft 119A-119G on which the respective roller 104, 108, 112, 118A-118D rotates. The leading roller 104 again comprises the leading hexagonal shaft 119A on which the leading roller 104 rotates. The secondary roller 108 again comprises the secondary hexagonal shaft 119B on which it rotates. The motorized roller 112 again comprises the motorized hexagonal shaft 119C on which it rotates. Each of the four auxiliary rollers 118A-118D again comprises the respective first, second, third, or fourth auxiliary hexagonal shaft 119D-119G on which it rotates.

The robotic payload conveyor 100 again further comprises the left side assembly 150A and the right side assembly 150B. The left side assembly 150A and the right side assembly 150B again hold in place each of the plurality of rollers 104, 108, 112, 118A-118D while allowing each of the plurality of rollers 104, 108, 112, 118A-118D to rotate. The left side assembly 150A again comprises the left side assembly bulb 151A and the right side assembly 150B again comprises the right side assembly bulb 151B, the left side assembly bulb 151A and the right side assembly bulb 151B together again configured to hold the leading roller 104 in place so that the leading roller length 122 is less than one or more of one or more of the secondary roller length 124, the motorized roller length 126, and the respective auxiliary roller lengths 130A-130D.

Each of the respective hexagonal shafts 119A-119G is held in place by the left side assembly 150A and by the right side assembly 150B. (More details are provided in FIG. 1F.) Preferably, but not necessarily, each of the plurality of rollers 104, 108, 112, 118A-118D rotates about the respective hexagonal shaft 119A-119G. Alternatively, or additionally, one or more of the respective hexagonal shafts 119A-119G is free to rotate while being held in place by the left side assembly 150A and by the right side assembly 150B.

The left side assembly 150A again comprises the left side panel 177A and the left side housing 178A. The right side assembly 150B again comprises the right side panel 177B and the right side housing 178B. The left side panel 177A and the right side panel 177B again are configured to hold the poly-V hubs 117A-117F while allowing the poly-V hubs 117A-117F to freely rotate so that the corresponding poly-V belts 116A-116D can rotate.

The right side assembly 150A again further comprises the safety guard 180.

The left side assembly 150A again further comprises the left roller alignment rail 181A. The right side assembly 150B again further comprises the right roller alignment rail 181B.

The conveyor 100 again further comprises the base assembly 160. The base assembly 160 again serves as a main structural member of the robotic payload conveyor 100. The base assembly 160 again is operably connected to the left side assembly 150A and to the right side assembly 150B. The base assembly 160 again supports the left side assembly 150A and the right side assembly 150B.

The conveyor 100 again further comprises the backstop 170. The backstop 170 again is operably connected to the left side assembly 150A and to the right side assembly 150B. The backstop 170 again is configured to stop motion of the payload (not shown in FIG. 1E) in the backward direction 172 toward the back side 175 of the conveyor 100. Alternatively, or additionally, the roller assembly 102 is configured to move the payload (not shown in FIG. 1E) along the conveyor 100 in a backward direction.

FIG. 1F depicts a further exploded view of principal and secondary components of the robotic payload conveyor 100. The conveyor 100 again comprises the conveyor belt roller assembly 102. The roller assembly 102 again comprises the plurality of rollers 104, 108, 112, 118A-118D, each of the plurality of rollers 104, 108, 112, 118A-118D again preferably being configured to rotate. The plurality of rollers 104, 108, 112, 118A-118D again collectively form the roller assembly 102 configured to move the payload (not shown in FIG. 1D) along the conveyor 100 in the forward direction 120 toward the front side 106 of the conveyor 100. The roller assembly 102 again comprises the leading roller 104 that is again configured to rotate, the leading roller 104 again being positioned near the front side 106 of the conveyor 100.

The leading roller 104 again comprises the first leading O-ring groove 132A. The leading roller 104 again comprises the second leading O-ring groove 132B, the second leading O-ring groove 132B again configured to accommodate an O-ring belt 110. The second leading O-ring groove 132B is again further configured to prevent the O-ring belt 110 from moving from side to side on the leading roller 104.

The roller assembly 102 again further comprises the secondary roller 108 that is again configured to rotate.

The leading roller 104 again comprises the first leading O-ring groove 132A, the first leading O-ring groove 132A configured to accommodate an O-ring belt (this O-ring belt is not shown in this figure). The leading roller 104 further comprises the second leading O-ring groove 132B, the second leading O-ring groove 132B configured to accommodate the O-ring belt 110. The second leading O-ring groove 132B is again further configured to prevent the O-ring belt 110 from moving from side to side on the leading roller 104. The secondary roller 108 again comprises the first secondary O-ring groove 132C. The secondary roller 108 again comprises the second secondary O-ring groove 132D, the second secondary O-ring groove 132B again configured to accommodate the O-ring belt 110.

The O-ring belt 110 is again attached to the secondary roller 108 using the second secondary O-ring groove 132D.

The secondary roller 108 is again coupled to the leading roller 104 by the O-ring belt 110. The secondary roller 108 is again coupled to the motorized roller 112 by the first poly-V belt 116A.

The roller assembly 102 again further comprises the motorized roller 112 that is configured to rotate, the motorized roller 108 again being positioned adjacent to and immediately behind the secondary roller 108. The motorized roller 112 again comprises the motor 114 configured to cause the motorized roller 112 to rotate. The motorized roller 112 again is coupled to the secondary roller 108 by the first poly-V belt 116A.

The roller assembly 102 again further comprises the plurality of auxiliary rollers 118A, 118B, 118C, 118D, the auxiliary rollers 118A-118D again being positioned adjacent to and immediately behind the motorized roller 112. The motorized roller 112 is again coupled, either directly or indirectly, to the one or more auxiliary rollers 118A-118D. For example, and as depicted, the secondary roller 112 again is physically coupled to the first auxiliary roller 118A. For example, and as depicted, the secondary roller 108 again is physically coupled to the leading roller 104 by an O-ring belt 110.

Each of the rollers 104, 108, 112, 118A-118D again further comprises the respective hexagonal shaft 119A-119G on which the respective roller 104, 108, 112, 118A-118D rotates. The leading roller 104 again comprises the leading hexagonal shaft 119A on which the leading roller 104 rotates. The secondary roller 108 again comprises the secondary hexagonal shaft 119B on which it rotates. The motorized roller 112 again comprises the motorized hexagonal shaft 119C on which it rotates. Each of the four auxiliary rollers 118A-118D again comprises the respective first, second, third, or fourth auxiliary hexagonal shaft 119D-119G on which it rotates.

The robotic payload conveyor 100 again further comprises the left side assembly 150A and the right side assembly 150B. The left side assembly 150A again comprises the left side assembly bulb 151A and the right side assembly 150B again comprises the right side assembly bulb 151B, the left side assembly bulb 151A and the right side assembly bulb 151B together again configured to hold the leading roller 104 in place so that the leading roller length 122 is less than one or more of one or more of the secondary roller length 124, the motorized roller length 126, and the respective auxiliary roller lengths 130A-130D.

The left side assembly 150A and the right side assembly 150B hold the hexagonal shafts 119A-119G while allowing the rollers to each turn on its respective hexagonal shaft 119A-119G. The left side assembly 150A again comprises the left side panel 177A and the left side housing 178A. The left side panel 177A and the left side housing 178A are attached together using left side assembly fasteners 192A-192D to form the left side assembly 150A. For example, the left side assembly fasteners 192A-192D comprise screws.

The right side assembly 150B again comprises the right side panel 177B and the right side housing 178B. The right side panel 177B and the right side housing 178B are attached together using right side assembly fasteners 193A-193D to form the right side assembly 150A. For example, the right side assembly fasteners 193A-193D comprise screws.

The left side panel 177A and the right side panel 177B again are configured to hold the poly-V hubs 117A-117F while allowing the poly-V hubs 117A-117F to freely rotate so that the corresponding poly-V belts 116A-116D can rotate. The left side panel 177A further comprises left side shaft holes 189A-189G. The right side panel 177B further comprises right side shaft holes 190A-190G.

The right side assembly 150A again further comprises the right safety guard 180.

The left side assembly 150A again further comprises the left roller alignment rail 181A. The right side assembly 150B again further comprises the right roller alignment rail 181B.

Each of the rollers 104, 108, 112, 118A-118D again comprises the respective hexagonal shaft 119A-119G on which the roller 104, 108, 112, 118A-118D rotates. Each of the respective hexagonal shafts 119A-119G is again held in place by the left side assembly 150A and by the right side assembly 150B via the respective left side shaft hole 189A-189G and the respective right side shaft hole 190A-190G. Preferably, but not necessarily, each of the plurality of rollers 104, 108, 112, 118A-118D rotates about the respective hexagonal shaft 119A-119G. Alternatively, or additionally, one or more of the respective hexagonal shafts 119A-119G is free to rotate while being held in place by the left side assembly 150A and by the right side assembly 150B.

For example, the leading hexagonal shaft 119A is held in place by the left side assembly 150A and by the right side assembly 150B via a first left side shaft hole 189A and a first right side shaft hole 190A. Relative to the left side shaft holes 189B-189G for the six other rollers 108, 104, 108, 112, 118A-118D, the left side shaft hole 189A is located in a position on the left side panel 177A that is closer to the right side panel 177B. Relative to the right side shaft holes 190B-189G for the six other rollers 108, 104, 108, 112, 118A-118D, the right side shaft hole 190A is located in a position on the right side panel 177B that is closer to the left side panel 177A. This means, as mentioned above, that the leading roller length 122 is less than the secondary roller length 124, the leading roller length 122 is less than the motorized roller length 126, and the leading roller length 122 is less than each of the respective auxiliary roller lengths 130A-130D.

For example, the secondary hexagonal shaft 119B is held in place by the left side assembly 150A and by the right side assembly 150B via a second left side shaft hole 189B and a second right side shaft hole 190B. A similar description applies to the motorized hexagonal shaft 119C and to the first, second, third, and fourth auxiliary hexagonal shafts 119D-119G.

The conveyor 100 again further comprises the base assembly 160. The base assembly 160 again supports the left side assembly 150A and the right side assembly 150B.

The right side assembly 150B is fastened to the base assembly 160 using a plurality of right side assembly-base assembly fasteners 194A-194E. For example, the right side assembly-base assembly fasteners 194A-194E fasteners comprise screws. The left side assembly 150A is similarly fastened to the base assembly 160 using a plurality of left side assembly-base assembly fasteners (not shown in this figure).

The conveyor 100 again further comprises the backstop 170. The backstop 170 again is configured to stop motion of the payload (not shown in FIG. 1F) in the backward direction 172 toward the back side 175 of the conveyor 100. The backstop 170 is fastened to the base assembly 160 using backstop-base fasteners 195A-195C. For example, the backstop-base fasteners 195A-195C comprise screws. The backstop 170 is fastened to the left side assembly 150A using backstop-left side assembly fasteners 196A-196C. For example, the backstop-left side assembly fasteners 196A-196C comprise screws. The backstop 170 is fastened to the right side assembly 150B using backstop-right side assembly fasteners 197A-197C. For example, the backstop-right side assembly fasteners 197A-197C comprise screws.

The right roller alignment rail 181B is attached to the safety guard 180 using right safety fasteners 199A-199B. For example, the right safety fasteners 199A-199B comprise screws.

FIGS. 2A-2D are a set of four drawings of the robotic payload transport system.

FIG. 2A depicts an exploded drawing of principal components of the robotic payload transport system 200. The robotic payload transport system 200 comprises the robotic payload conveyor 100. The conveyor 100 again comprises the roller assembly 102. The roller assembly 102 again comprises the rollers 104, 108, 112, 118A-118D. The conveyor 100 again further comprises the left side assembly 150A and the right side assembly 150B. The left side assembly 150A again comprises the left side assembly bulb 151A and the right side assembly 150B again comprises the right side assembly bulb 151B.

The robotic payload transport system 200 further comprises a riser assembly 210 operably attached to the conveyor 100, the riser assembly configured to support the roller conveyor 100. The system 200 further comprises the mobile robot 220. The riser assembly 210 comprises a structure that allows adjustment of a height 230 of the conveyor 100, thereby allowing for different heights 230 of the roller assembly 102 above the robot 220. (The roller assembly height 230 is essentially the same as the conveyor height 230.) The riser assembly 210 can be designed for a fixed height 230 of interest. Alternatively, or additionally, the riser assembly 210 permits one or more of manual adjustment of the height 230 and automatic adjustment of the height 230. For example, the mobile robot 220 comprises a robot 220 that has the ability to move around in a building (not shown in the figure). For example, the mobile robot 220 comprises a robot 220 that has the ability to move around in a building (not shown in the figure) while carrying a payload (not shown in the figure). For example, the building comprises a warehouse.

For example, the mobile robot 220 comprises a Freight 100 mobile robot manufactured by Fetch Robotics of San Jose, Calif. (www.fetchrobotics.com).

Figure 2B:
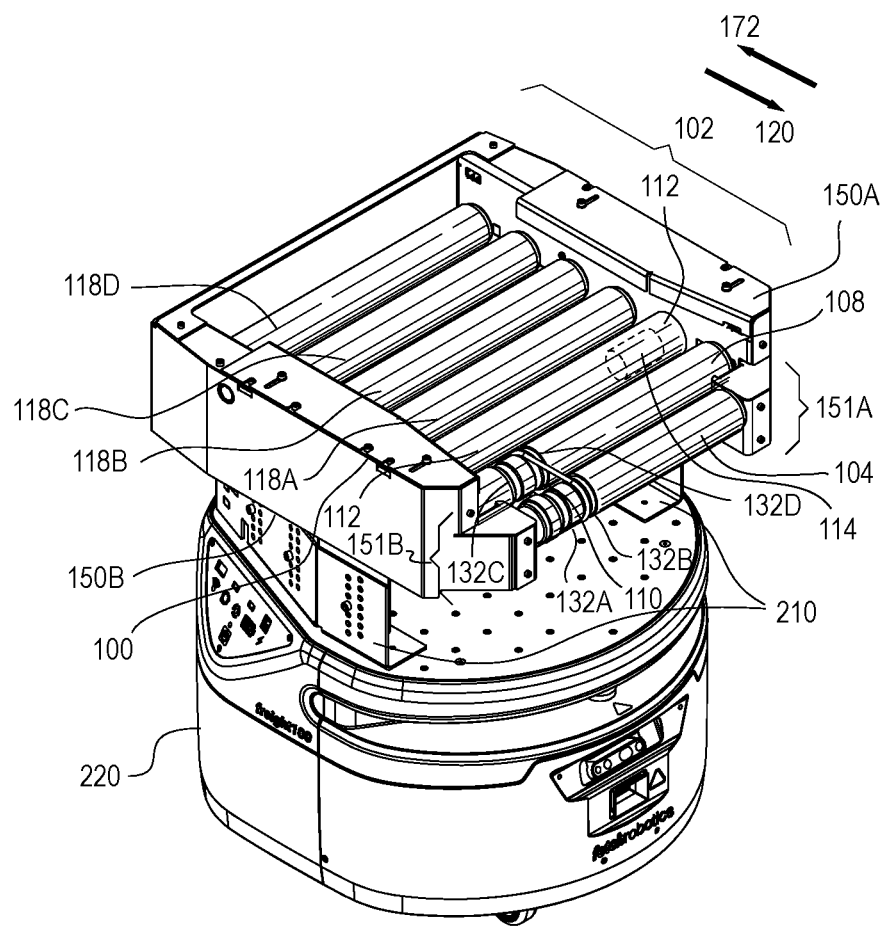

FIG. 2B depicts a fully assembled view of the principal components of the robotic payload transport system 200. The robotic payload transport system 200 again comprises the conveyor 100. The conveyor 100 again comprises the roller assembly 102. The roller assembly 102 again comprises the rollers 104, 108, 112, 118A-118D. The conveyor 100 again further comprises the left side assembly 150A and the right side assembly 150B. The robotic payload conveyor 100 again further comprises the left side assembly 150A and the right side assembly 150B. The left side assembly 150A again comprises the left side assembly bulb 151A and the right side assembly 150B again comprises the right side assembly bulb 151B, the left side assembly bulb 151A and the right side assembly bulb 151B together again configured to hold the leading roller 104 in place so that the leading roller length 122 is less than one or more of one or more of the secondary roller length 124, the motorized roller length 126, and the respective auxiliary roller lengths 130A-130D.

FIG. 2B also shows the forward direction 120 toward the front side 106 of the conveyor 100 and the backward direction 175 toward the back side 175 of the conveyor 100. The robotic payload transport system 200 again further comprises the riser assembly 210, which is again operably attached to the conveyor 100. The riser assembly 210 again comprises an actuator (not shown in this figure; shown in FIGS. 2D-2E) that allows adjustment of the height 230 of the conveyor 100, thereby allowing for different heights 230 of the rollers 104, 108, 112, 118A-118D. The riser assembly 210 can again be designed for the fixed height 230 of interest. Alternatively, or additionally, the riser assembly 210 again permits one or more of manual adjustment of the height 230 and automatic adjustment of the height 230. As shown in FIG. 2B, the riser assembly 210 is adjusted for a minimum height 230A of the conveyor 100 above the mobile robot 220.

Figure 2C:
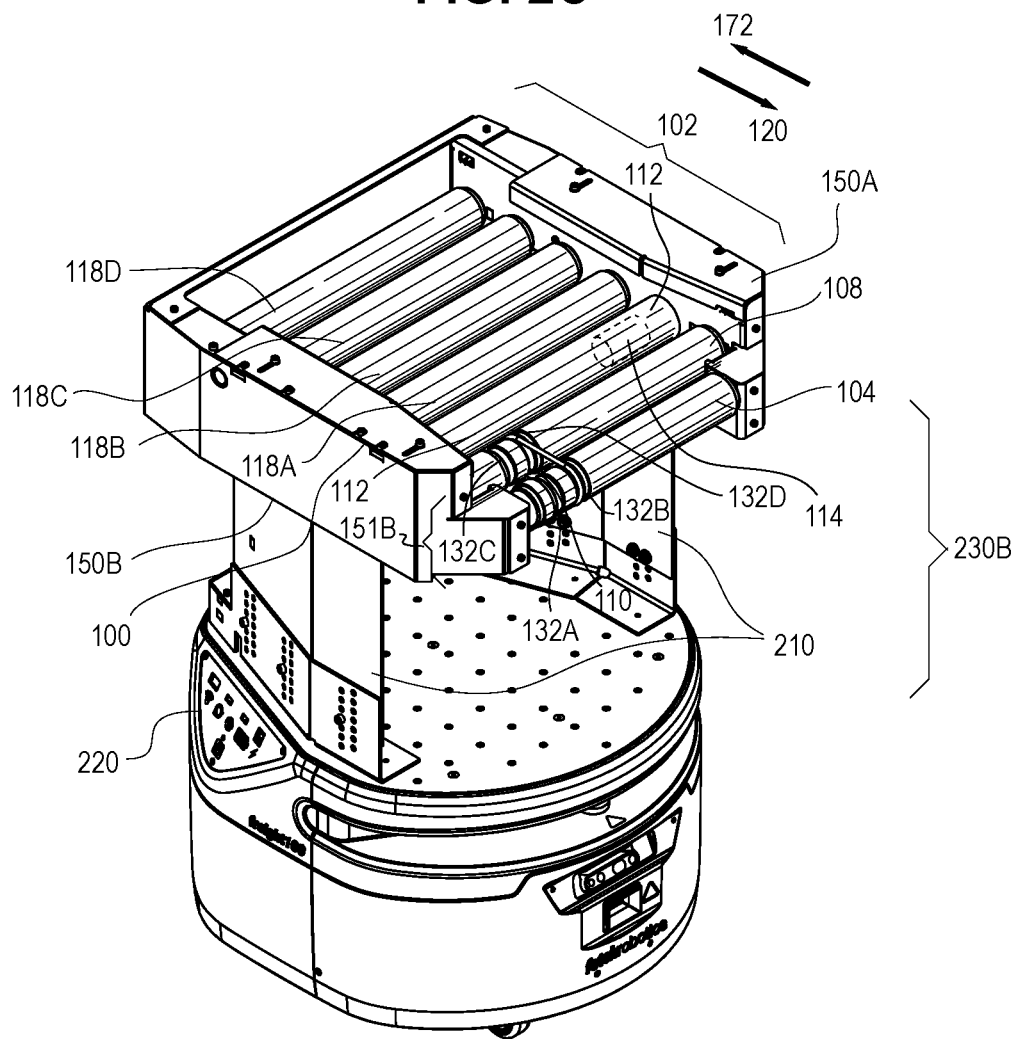

FIG. 2C depicts a fully assembled view of the principal components of the robotic payload transport system 200. The robotic payload transport system 200 again comprises the conveyor 100. The conveyor 100 again comprises the roller assembly 102. The roller assembly 102 again comprises the rollers 104, 108, 112, 118A-118D. The robotic payload transport system 200 again further comprises the riser assembly 210, which is again operably attached to the conveyor 100. The riser assembly 210 again comprises an actuator (not shown in this figure; shown in FIGS. 2D-2E) that allows adjustment of the height 230 of the conveyor 100, thereby allowing for different heights 230 of the rollers 104, 108, 112, 118A-118D. The conveyor 100 again further comprises the left side assembly 150A and the right side assembly 150B. The robotic payload conveyor 100 again further comprises the left side assembly 150A and the right side assembly 150B. The left side assembly 150A again comprises the left side assembly bulb 151A and the right side assembly 150B again comprises the right side assembly bulb 151B, the left side assembly bulb 151A and the right side assembly bulb 151B together again configured to hold the leading roller 104 in place so that the leading roller length 122 is less than one or more of one or more of the secondary roller length 124, the motorized roller length 126, and the respective auxiliary roller lengths 130A-130D.

FIG. 2C also again shows the forward direction 120 toward the front side 106 of the conveyor 100 and the backward direction 178 toward the back side 175 of the conveyor 100. The riser assembly 210 can again be designed for the fixed height 230 of interest. Alternatively, or additionally, the riser assembly 210 again permits one or more of manual adjustment of the height 230 and automatic adjustment of the height 230. As shown in FIG. 2C, the riser assembly 210 is adjusted for a maximum height 230B of the conveyor 100 above the mobile robot 220.

Figure 2E:
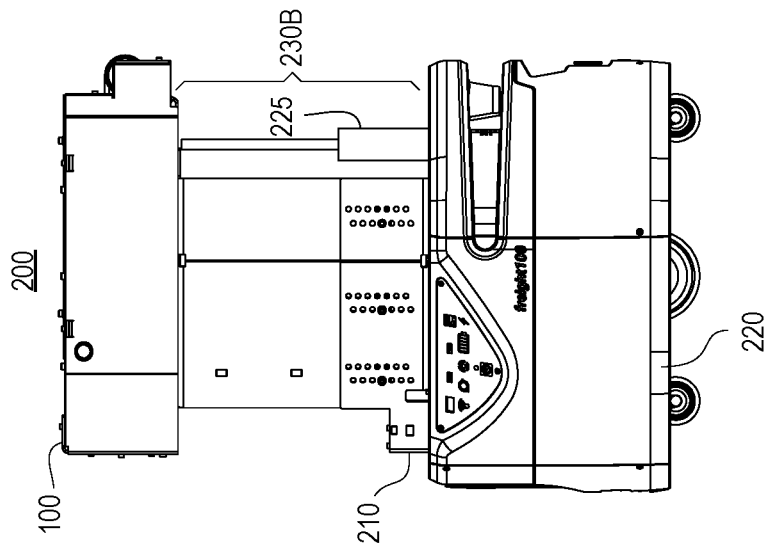
Figure 2D:
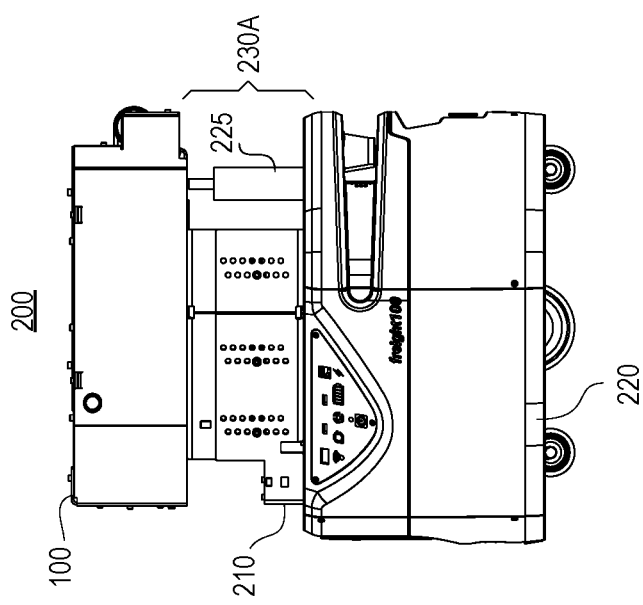

FIGS. 2D-2E depict two fully assembled side views of the principal components of the robotic payload transport system 200. FIG. 2D depicts a side view of the robotic payload transport system 200 seen in FIG. 2B, again comprises the conveyor 100, the riser assembly 210, and the robot 220. The riser assembly 210 comprises an actuator 225.

The actuator 225 is used to adjust the height 230 of the conveyor 100 above the mobile robot 220. The riser assembly 210 can again be designed for the fixed height 230 of interest. Alternatively, or additionally, the riser assembly 210 again permits one or more of manual adjustment of the height 230 using the actuator 225 and automatic adjustment of the height 230 using the actuator 225. As in FIG. 2B, the riser assembly 210 is adjusted for a minimum height 230A of the conveyor 100 above the mobile robot 220.

FIG. 2E depicts a side view of the robotic payload transport system 200 seen in FIG. 2C. The system 200 again comprises the conveyor 100, the riser assembly 210, and the robot 220. The riser assembly 210 again comprises the actuator 225.

The actuator 225 is again used to adjust the height 230 of the conveyor 100 above the mobile robot 220. The riser assembly 210 can again be designed for the fixed height 230 of interest. Alternatively, or additionally, the riser assembly 210 again permits one or more of manual adjustment of the height 230 using the actuator 225 and automatic adjustment of the height 230 using the actuator 225. As in FIG. 2C, the riser assembly 210 is adjusted for a maximum height 230B of the conveyor 100 above the mobile robot 220.

Figure 3:
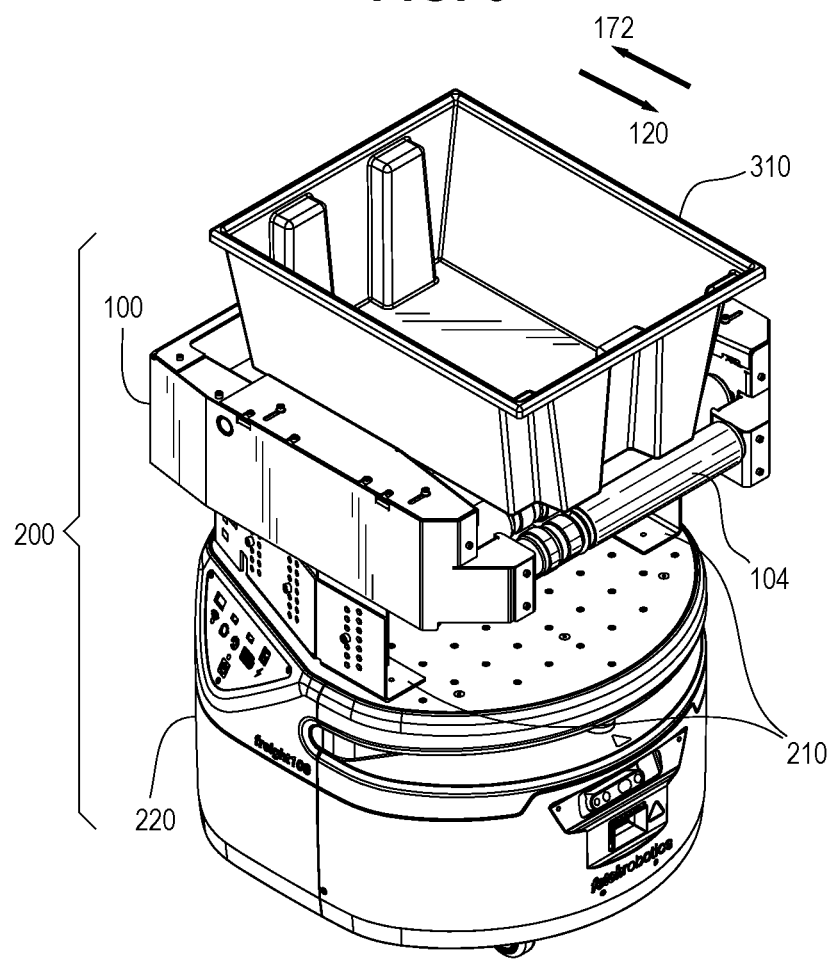
FIG. 3 depicts a fully assembled view of the principal components of the robotic payload transport system while in use to transport a payload.

FIG. 3 depicts a fully assembled view of the principal components of the robotic payload transport system 200 while in use to transport a payload 310. As depicted, the payload 310 comprises a bin 310. The system 200 again comprises the roller conveyor 100, the riser assembly 210, and the mobile robot 220. The conveyor 100 again comprises the leading roller 104 (the other rollers are not shown in this figure). The robotic payload transport system 200 again comprises the robotic payload conveyor 100, the riser assembly 210, and the mobile robot 220.

Figure 4:
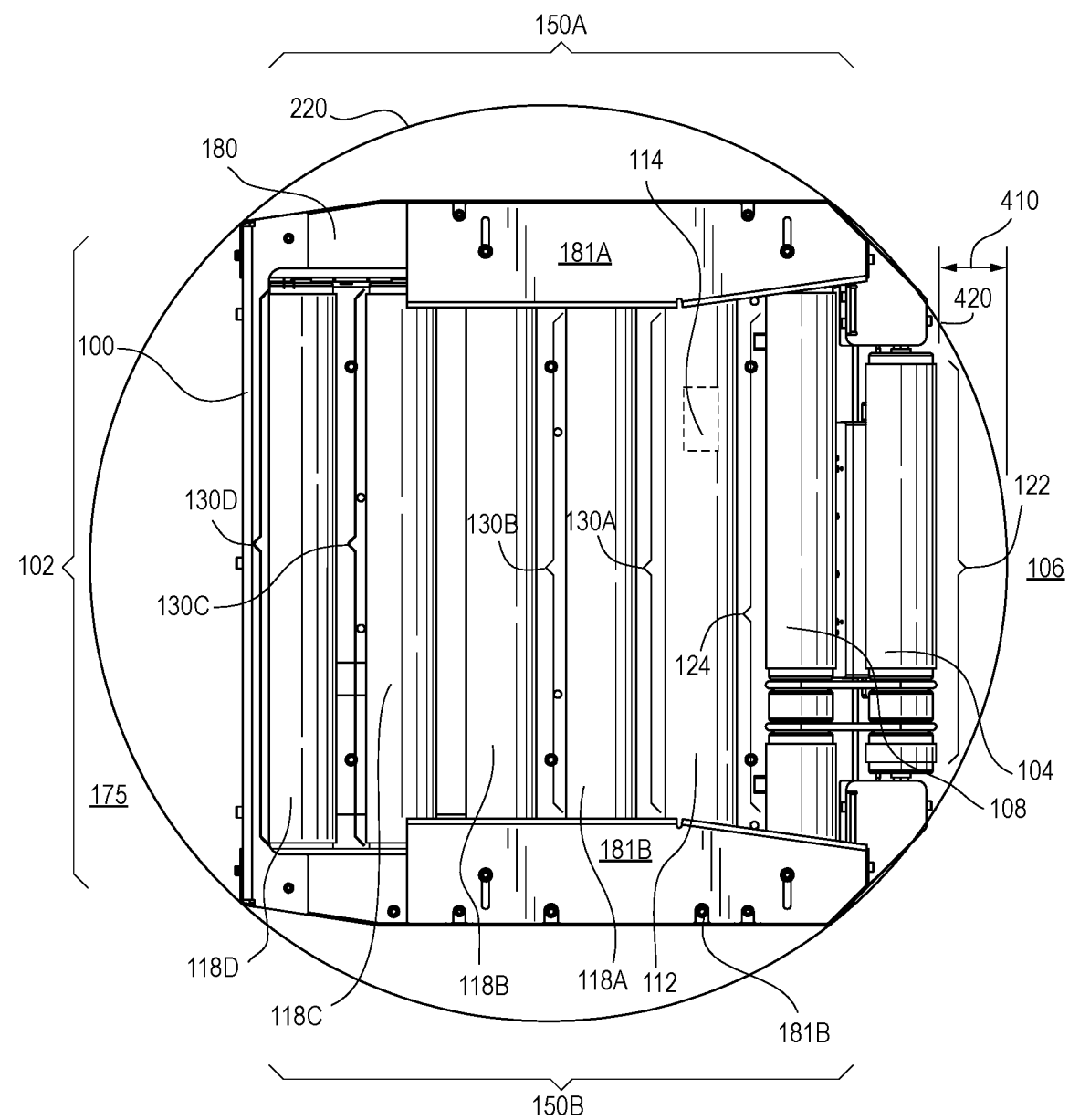
FIG. 4 is a top view drawing of the roller conveyor mounted to the mobile robot.

FIG. 4 is a top view drawing of the roller conveyor 100 mounted to the mobile robot 220, which has the substantially circular profile 220. The conveyor 100 again comprises the roller assembly 102. The roller assembly 102 again comprises the leading roller 104, the secondary roller 108, the motorized roller 112, and the auxiliary rollers 118A-118D. The motorized roller 112 again comprises the motor 114. The conveyor 100 again further comprises the left side assembly 150A and the right side assembly 150B. The conveyor 100 again further comprises the backstop 170. Also shown are the front side 106 and the back side 175 of the conveyor 100. The conveyor 100 again further comprises the safety guard 180, the left roller alignment rail 181A and the right roller alignment rail 181B.

The leading roller 104 again has the leading roller length 122. The secondary roller 108 again has the secondary roller length 124. The motorized roller 112 again has the motorized roller length 126. The auxiliary rollers 118A-118D again have the respective auxiliary roller lengths 130A-130D. The leading roller length 122 again is less than the motorized roller length 126. The leading roller length 122 is less than one or more of the secondary roller length 124, the motorized roller length 126, and the respective auxiliary roller lengths 130A-130D. As depicted, the leading roller length 122 is less than the secondary roller length 124, the leading roller length 122 is less than the motorized roller length 126, and the leading roller length 122 is less than each of the respective auxiliary roller lengths 130A-130D.

The circle 220 circumscribes a circular profile 220 of a smallest diameter within which the roller conveyor 100 can be enclosed. A leading roller offset 410 equals a distance from the leading roller 104 to a nearest leading point 420 comprised in the circular profile 220.

The relatively small leading roller length 122 facilitates a small value for the leading roller offset 410, because the leading roller 104 is able to come closer to an edge of the circle 220 than would be the case if the leading roller length 122 were closer to the length of the other rollers 108, 112, 118A-118D.

The leading roller offset 410 is lowered due to the leading roller length 122 being less than the length of at least one of the other rollers. Furthermore, the leading roller offset 410 is lowered due to the leading roller length 122 being less than the secondary roller length 124, the leading roller length 122 being less than the motorized roller length 126, and the leading roller length 122 being less than each of the respective auxiliary roller lengths 130A-130D.

The roller conveyor system is configured to provide one or more of high power transmission and a compact profile, wherein high power transmission is defined as transmission of between approximately 50 watts and approximately 100 watts for a payload of approximately 150 pounds, and wherein high power transmission is further defined as transmission of approximately 500 watts for a payload of approximately 2,000 pounds.

Alternatively, or additionally, the roller conveyor system is configured to provide both high power transmission and a compact profile, wherein high power transmission is defined as transmission of between approximately 50 watts and approximately 100 watts for a payload of approximately 150 pounds, and wherein high power transmission is further defined as transmission of approximately 500 watts for a payload of approximately 2,000 pounds.

Figure 5:
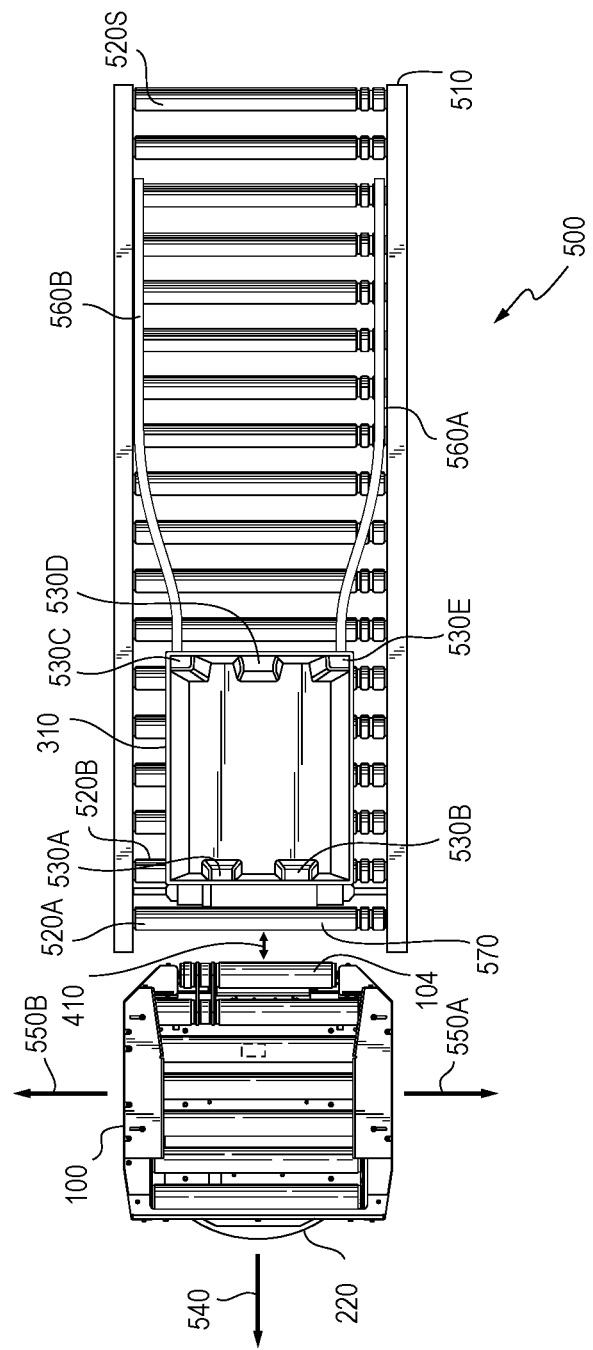
FIG. 5 is a top view drawing of a system comprising the roller conveyor mounted on the mobile robot in use in conjunction with a stationary conveyor.

FIG. 5 is a top view drawing of a system 500 comprising the roller conveyor 100 mounted on the mobile robot 220 in use in conjunction with a stationary conveyor 510. As mentioned above in connection with FIGS. 1A and 1D (the point is also applicable to FIGS. 1E and 1F), when executing a transfer of the payload 310 between the conveyor 100 and another device such as the stationary conveyor 510, which in practical terms means a transfer of the payload (not shown in this figure) from the leading roller 104 to another device (not shown in this figure), the closer the leading roller 104 is to the other device (not shown in this figure), the smoother and more reliable the transfer will be. The roller conveyor 100 again comprises the leading roller 104.

The stationary conveyor 510 comprises a plurality of stationary conveyor rollers 520A-520S including a leading stationary conveyor roller 510A, a secondary stationary roller 510B, and a terminating stationary roller 510S. The stationary conveyor 510 further comprises the payload 310, the payload 310 again comprising the bin 310. The bin 310 comprises items 520A-520E. For example, items 520A-520E comprises order items 520A-520E that the mobile robot 220 will be delivering in preparation for shipping to a customer. For example, items 520A-520E comprise inventory items 520A-520E that have been received and which the mobile robot 220 will be delivering to inventory storage. The stationary conveyor 510 further comprises a left stationary conveyor side guide 560A and a right stationary conveyor side guide 560B. The left and right stationary conveyor side guides 560A and 560B are usable to center the bin 310 on the conveyor 100 so that the bin 310 consistently comes out of the stationary conveyor 510 at a same departure position 570 each time the bin 310 leaves the stationary conveyor 510 and regardless of an entry position (not shown) of the bin 310 when the bin 310 enters the stationary conveyor 510. The left and right stationary conveyor side guides 560A and 560B are important in applications in which the departure position 570 of the bin 310 is critical, for example, when the stationary conveyor 510 is wider than the roller conveyor 100.

The mobile robot 220 comprising the roller conveyor 100 positions itself immediately adjacent to the stationary conveyor 510. For example, the mobile robot 220 comprising the roller conveyor 100 positions itself at a distance from the stationary conveyor 510 equal to the leading roller offset 410 discussed in FIG. 4. For example, one typical workflow entails the roller conveyor 100 loading the bin 310 onto the stationary roller conveyor 510. The leading roller offset 410 comprises a minimum distance that the mobile robot 220 comprising the roller conveyor 100 can have can from the stationary conveyor 510.

For example, after unloading the bin 310, it may be desirable that the mobile robot 220 perform a zero point turn and rotate 180 degrees to continue in an outward direction 540 away from the stationary conveyor 510 in order for the mobile robot 220 comprising the roller conveyor 100 to proceed to a next location to perform a next step in its workflow. The mobile robot 220 simply backing up in the outward direction 540 may be less desirable due, for example, to one or more of a lack of backward-facing sensors on the mobile robot 220 and a physical inability of the mobile robot 220 to directly switch directions by 180 degrees without turning. Alternatively, or additionally, the mobile robot 220 comprising the roller conveyor 100 may rotate 90 degrees clockwise and then proceed in a first perpendicular direction 550A. Alternatively, or additionally, the mobile robot 220 comprising the roller conveyor 100 may rotate 90 degrees counter-clockwise and then proceed in a second perpendicular direction 550B.

Advantages of embodiments of the invention include a design allowing for one or more of a compact profile and high power transmission. Further advantages of embodiments of the invention include a design allowing for both a compact profile and high power transmission. Advantages of the hybrid design of the power transmission include that it enables a shorter leading roller to be closer to the edge of the circular perimeter profile of the mechanism, without a need for rollers to be coupled with a Poly-V belt, and without a requirement that the leading and secondary rollers have the same length.

Further advantages of embodiments of the invention include that the compact profile can facilitate the mobile robot performing a zero point turn and rotating 180 degrees to continue in an outward direction away from a stationary conveyor or other delivery/pickup point. A still additional advantage is that thereby the utility of a robot lacking backward sensors is enhanced. Yet further advantages of embodiments of the invention include that the mobile robot can come to a distance from the stationary conveyor or other delivery/pickup point that is equal to the leading roller offset and less than the prior art. A still additional advantage is that the leading roller offset is also less than would be the case if the leading roller length were closer to the lengths of the other rollers.

A further advantage of embodiments of the invention is that, for a given payload width and a given payload length, embodiments of the invention allow the roller conveyor to fit within a smaller circular profile, thereby permitting superior autonomous navigation for the mobile robot. That is, the hybrid belt drive supports a larger volume payload in a given circular profile than a standard belt transmission. Additionally, according to embodiments of the invention, relative to the prior art, a robot having only forward-looking sensors can perform a 180-degree turn can hold a larger volume payload that fits within a circular profile.

The two different power transmissions allow the rollers to rotate together using the two different power transmission methods, thereby allowing for preferable geometry of the overall system. Alternatively, or additionally, the power transmission uses a single power transmission method.

Further advantages of the invention include the smaller leading roller offset 410 as shown in FIG. 4. The smaller leading roller offset dimension helps minimize the danger of the bin falling between the roller conveyor and the stationary conveyor during autonomous transfer of the bin between the roller conveyor and the stationary conveyor, thereby minimizing damage to one or more of the bin, the robot, and the conveyor. This smaller dimension also allows for transfer of more bins and/or transfer of smaller bins that may get stuck between the rollers if the gap is larger.

Other representative embodiments can be implemented using one or more of different configurations and different components. For example, details of the assembly of components of the robotic payload transport system could be altered without substantially affecting the functioning of embodiments of the invention. For example, screws could be positioned differently. Screws could attach from the opposite side of the device relative to what is depicted in FIG. 1F. Other attachment methods not involving screws could be used.

For example, it will be understood by those skilled in the art that software used by the robotic payload conveyor may be located in any location in which it may be accessed by the system. For example, it will be understood by one of ordinary skill in the art that the order of certain fabrication steps and certain components can be altered without substantially impairing the functioning of the invention. It is intended, therefore, that the subject matter in the above description shall be interpreted as illustrative and shall not be interpreted in a limiting sense.

For example, embodiments of the invention could comprise one or more of a different number of primary rollers, a different number of secondary rollers, a different number of motorized rollers, and a different number of auxiliary rollers, including in certain embodiments one or more of zero primary rollers, zero secondary rollers, zero motorized rollers, and zero auxiliary rollers. For example, according to certain alternative embodiments, the motorized roller could be the leading roller. For example, one or more rollers could be a non-rotating roller. For example, at least one of the shafts is non-hexagonal. For example, all the shafts are non-hexagonal. For example, at least one of the rollers rotates on a respective shaft. For example, all the rollers rotate on their respective shafts. For example, other embodiments of the invention could comprise both the roller assembly and a conveyor belt. For example, further embodiments of the invention could comprise the roller assembly with a conveyor belt positioned across the roller assembly. For example, yet further embodiments of the invention could comprise a combination of the roller assembly and the conveyor belt.

Alternatively, or additionally, instead of a design requiring both poly-V belts and O-ring belts, embodiments of the invention can employ only poly-V belts and no O-ring belts. Alternatively, or additionally, instead of a design requiring both poly-V belts and O-ring belts, embodiments of the invention can employ only O-ring belts and no poly-V belts. Alternatively, or additionally, embodiments of the invention can operate without a motorized roller, using all idler rollers, that is, all rollers that are not motorized rollers. According to these sets of embodiments, for example, a separate motor drives the rollers using a set of belts.

Alternatively, or additionally, embodiments of the invention could comprise different configurations of one or more of the poly-V belts and the O-ring belts, including one or more of zero poly-V belts and zero O-ring belts. Alternatively, or additionally, a poly-V belt can connect two rollers that are not adjacent to each other. Alternatively, or additionally, an O-ring belt can connect two rollers that are not adjacent to each other.

Alternative methods of power transmission capable of transmitting power between two rollers and usable by embodiments of the invention include, in addition to one or more of O-ring belts and poly-V belts, roller chains, timing belts, round belts, V-belts, flat belts, line shafts, and gears.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A roller conveyor system configured for installation on top of a mobile robot to provide robotic transport of a payload, comprising:
a roller conveyor, the roller conveyor comprising:
a roller assembly comprising a plurality of rollers, the rollers configured to move a payload, each of the rollers being configured to rotate, the roller assembly comprising a leading roller positioned nearest to a front side of the roller conveyor, the leading roller having a leading roller length, the roller assembly further comprising a motorized roller, the motorized roller comprising a motor configured to cause the motorized roller to rotate, the motorized roller having a motorized roller length; and
a power transmission configured to drive the rollers, the power transmission coupling the motorized roller to the leading roller, wherein the leading roller length is less than the motorized roller length.

2. The roller conveyor system of claim 1, further comprising a riser assembly configured to support the roller conveyor.

3. The roller conveyor system of claim 2, wherein the riser assembly comprises an actuator usable to adjust a height of the roller conveyor above the mobile robot.

4. The roller conveyor system of claim 1, wherein the power transmission comprises a belt drive.

5. The roller conveyor system of claim 4, wherein the belt drive comprises a hybrid belt drive.

6. The roller conveyor system of claim 1, wherein the rollers are configured to move the payload toward a front side of the roller conveyor.

7. The roller conveyor system of claim 1, wherein the rollers are configured to move the payload toward a back side of the roller conveyor.

8. The roller conveyor system of claim 1, the roller assembly further comprising one or more auxiliary rollers, the auxiliary rollers being adjacent to and behind the motorized roller, each of the auxiliary rollers having a respective auxiliary roller length.

9. The roller conveyor system of claim 8, wherein the motorized roller is coupled, either directly or indirectly, to one or more auxiliary rollers.

10. The roller conveyor system of claim 8, wherein the motorized roller is physically coupled to one or more auxiliary rollers.

11. The roller conveyor system of claim 8, wherein the motorized roller is physically coupled to one or more auxiliary rollers by one or more poly-V belts.

12. The roller conveyor system of claim 8, wherein the leading roller length is less than one or more of the auxiliary roller lengths.

13. The roller conveyor system of claim 8, wherein the leading roller length is less than each of the auxiliary roller lengths.

14. The roller conveyor system of claim 1, wherein all rollers rotate in a same direction.

15. The roller conveyor system of claim 8, wherein the roller assembly further comprises a secondary roller positioned adjacent to and immediately behind the leading roller, the secondary roller having a secondary roller length.

16. The roller conveyor system of claim 15, wherein the leading roller length is less than the secondary roller length.

17. The roller conveyor system of claim 15, wherein the leading roller length is less than the motorized roller length.

18. The roller conveyor system of claim 15, wherein the leading roller length is less than the secondary roller length, the leading roller length is less than the motorized roller length, and the leading roller length is less than each of the respective auxiliary roller lengths.

19. The roller conveyor system of claim 15, wherein the motorized roller is positioned adjacent to and immediately behind the secondary roller.

20. The roller conveyor system of claim 19, wherein the motorized roller is coupled, either directly or indirectly, to the secondary roller.

21. The roller conveyor system of claim 19, wherein the motorized roller is physically coupled to the secondary roller.

22. The roller conveyor system of claim 19, wherein the motorized roller is physically coupled to the secondary roller by a poly-V belt.

23. The roller conveyor system of claim 15, wherein the secondary roller is coupled, either directly or indirectly, to the leading roller.

24. The roller conveyor system of claim 15, wherein the secondary roller is physically coupled to the leading roller.

25. The roller conveyor system of claim 15, wherein the secondary roller is physically coupled to the leading roller by an O-ring belt.

26. The roller conveyor system of claim 19, wherein the roller assembly further comprises exactly four auxiliary rollers.

27. The roller conveyor system of claim 26, wherein the roller assembly further comprises exactly five poly-V belts, the five poly-V belts collectively coupling the four auxiliary rollers, the motorized roller, and the secondary roller.

28. The roller conveyor system of claim 27, wherein the roller assembly further comprises exactly one O-ring belt coupling the secondary roller and the primary roller.

29. The roller conveyor system of claim 1, wherein the roller conveyor further comprises a backstop operably connected to the roller assembly at a back side of the conveyor.

30. The roller conveyor system of claim 29, wherein the backstop is configured to stop motion of the payload toward the back side of the conveyor.

31. The roller conveyor of claim 30, wherein the leading roller offset represents an approximate minimum distance between the mobile robot comprising the roller conveyor and a stationary conveyor at which the mobile robot is performing one or more of a payload dropoff and a payload pickup.

32. The roller conveyor system of claim 30, wherein the leading roller offset is lowered due to the leading roller length being less than the length of at least one of the other rollers.

33. The roller conveyor system of claim 30, wherein the leading roller offset is lowered due to the leading roller length being less than the secondary roller length, the leading roller length being less than the motorized roller length, and the leading roller length being less than each of the respective auxiliary roller lengths.

34. The roller conveyor system of claim 30, wherein the roller conveyor system is configured to provide one or more of high power transmission and a compact profile.

35. The roller conveyor system of claim 34, wherein high power transmission is defined as transmission of between approximately 50 watts and approximately 100 watts for a payload of approximately 150 pounds, and wherein high power transmission is further defined as transmission of approximately 500 watts for a payload of approximately 2,000 pounds.

36. The roller conveyor system of claim 30, wherein the roller conveyor system is configured to provide both high power transmission and a compact profile.

37. The roller conveyor system of claim 36, wherein high power transmission is defined as transmission of between approximately 50 watts and approximately 100 watts for a payload of approximately 150 pounds, and wherein high power transmission is further defined as transmission of approximately 500 watts for a payload of approximately 2,000 pounds.

38. A roller conveyor system configured for installation on top of a mobile robot to provide robotic transport of a payload, comprising:
a roller conveyor, the roller conveyor comprising:
a roller assembly comprising a plurality of rollers rotating in a same direction, the rollers configured to move a payload toward a front side of the roller conveyor, each of the rollers being configured to rotate, the roller assembly comprising a leading roller positioned nearest to a front side of the roller conveyor, the leading roller having a leading roller length, the roller assembly further comprising a motorized roller, the motorized roller comprising a motor configured to cause the motorized roller to rotate, the motorized roller having a motorized roller length, the roller assembly further comprising one or more auxiliary rollers, the auxiliary rollers being adjacent to and behind the motorized roller, each of the auxiliary rollers having a respective auxiliary roller length, the motorized roller being physically coupled to the one or more auxiliary rollers by one or more poly-V belts, the roller assembly further comprising a secondary roller physically coupled to the motorized roller by a poly-V belt, the secondary roller also physically coupled to the leading roller by an O-ring belt, the secondary roller positioned adjacent to and immediately behind the leading roller, the secondary roller having a secondary roller length, wherein the motorized roller is positioned adjacent to and immediately behind the secondary roller, wherein the leading roller length is less than the secondary roller length, the leading roller length is less than the motorized roller length, and the leading roller length is less than each of the respective auxiliary roller lengths;
a backstop operably connected to the roller assembly at a back side of the conveyor, the backstop configured to stop motion of the payload toward the back side of the conveyor; and
a hybrid belt drive configured to drive the rollers, the drive coupling the motorized roller to the leading roller; and
a riser assembly configured to support the roller conveyor, the riser assembly comprising an actuator usable to adjust a height of the roller conveyor above the mobile robot.

* * * * *